(12) United States Patent
Hasegawa et al.

(10) Patent No.: US 7,930,387 B2
(45) Date of Patent: Apr. 19, 2011

(54) LOCATION INFORMATION SERVER SYSTEM AND WIRELESS COMMUNICATION SYSTEM USING THE SAME

(75) Inventors: Mikio Hasegawa, Tokyo (JP); Masugi Inoue, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 252 days.

(21) Appl. No.: 11/885,940

(22) PCT Filed: Mar. 7, 2005

(86) PCT No.: PCT/JP2005/003921
§ 371 (c)(1),
(2), (4) Date: Sep. 7, 2007

(87) PCT Pub. No.: WO2006/095406
PCT Pub. Date: Sep. 14, 2006

(65) Prior Publication Data
US 2008/0195730 A1 Aug. 14, 2008

(51) Int. Cl.
*G06F 15/173* (2006.01)
*G06F 15/16* (2006.01)
*H04H 20/71* (2008.01)
*H04H 60/09* (2008.01)
*H04W 36/00* (2009.01)
*H04B 1/38* (2006.01)
*H04M 1/00* (2006.01)

(52) U.S. Cl. ....... 709/224; 709/217; 709/207; 455/3.01; 455/3.03; 455/439; 455/560

(58) Field of Classification Search .................. 709/224, 709/217, 207; 455/3.01, 3.03, 3.04, 439, 455/560
See application file for complete search history.

(56) References Cited

U.S. PATENT DOCUMENTS

| | | | | |
|---|---|---|---|---|
| 5,432,842 A | * | 7/1995 | Kinoshita et al. | 455/440 |
| 7,020,701 B1 | * | 3/2006 | Gelvin et al. | 709/224 |
| 7,242,294 B2 | * | 7/2007 | Warrior et al. | 340/539.22 |
| 7,272,385 B2 | * | 9/2007 | Mirouze et al. | 455/414.1 |
| 7,295,119 B2 | * | 11/2007 | Rappaport et al. | 340/572.4 |
| 7,378,962 B2 | * | 5/2008 | Odenwald et al. | 340/539.22 |
| 2003/0109265 A1 | | 6/2003 | Yamamoto et al. | |

FOREIGN PATENT DOCUMENTS

EP 1 227 694 A1 7/2002

* cited by examiner

*Primary Examiner* — Kristie D Shingles
(74) *Attorney, Agent, or Firm* — Brinks Hofer Gilson & Lione

(57) ABSTRACT

A location information server system for acquiring the status of a user terminal in wireless communication network, comprising: a plurality of sensor means capable of communicating through a network; a priority database to location information from each sensor means; location information selecting means for selecting a location information having a high priority from overlapping location information with reference to the database; and a sensor information integration processing means which integrates acquisition information from at least two sensor means of the sensor means for acquiring the location information and the sensor means for acquiring identification information of a user terminal, and acquires the user terminal position wherein information from each means is accumulated in the location information server as terminal location information database and the location information server means includes a location information providing means capable of providing the sensor information to a predetermined network server which switches communication in the user terminal.

7 Claims, 27 Drawing Sheets

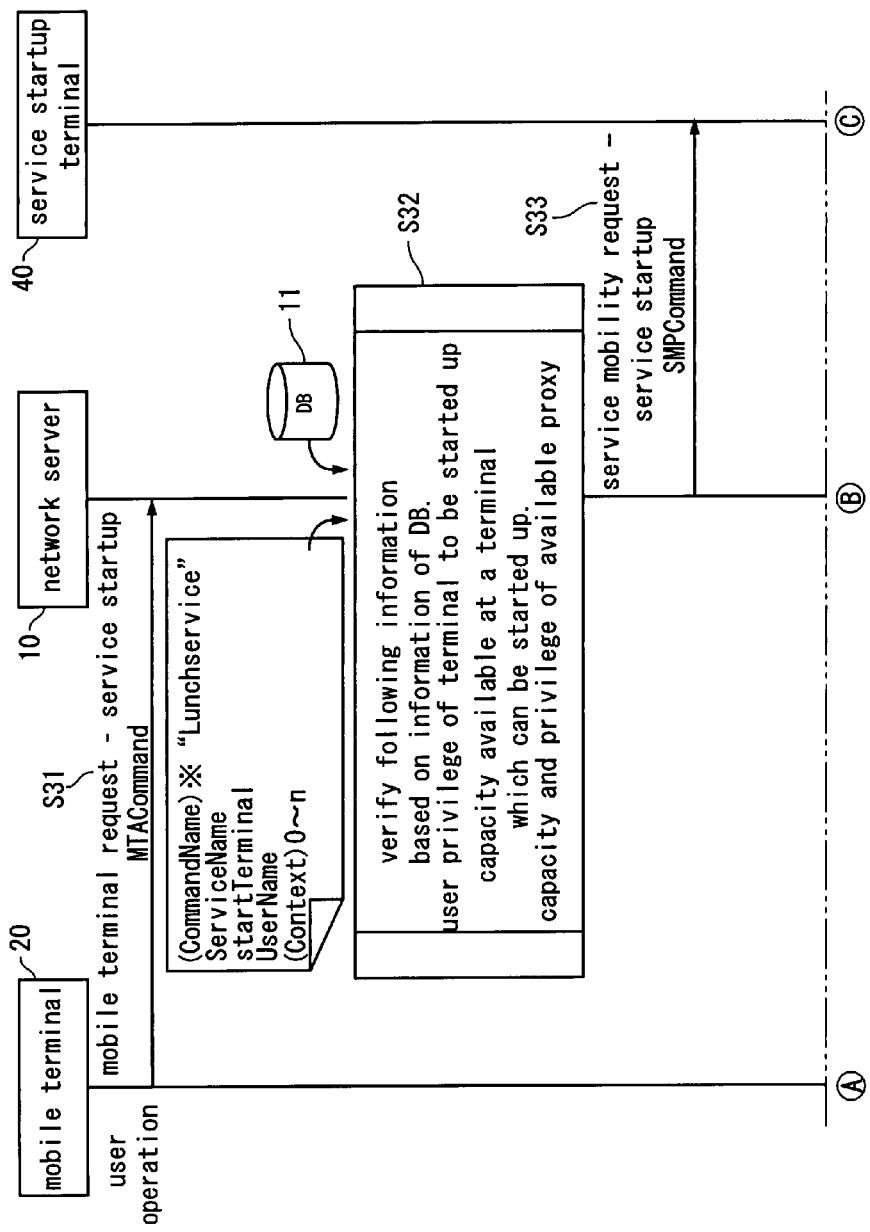

| Fig. 10 |
|---|
| Fig. 10A |
| Fig. 10B |

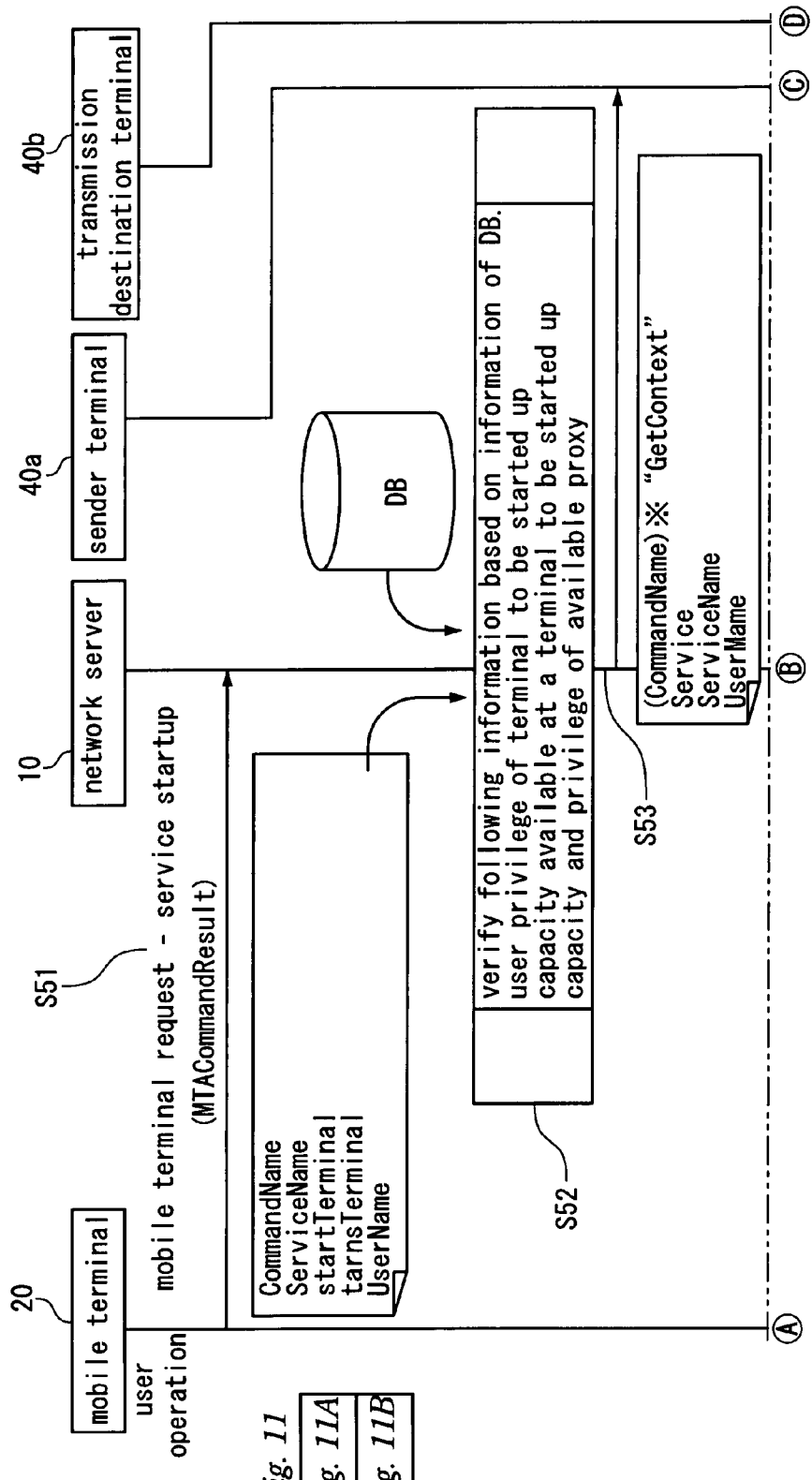

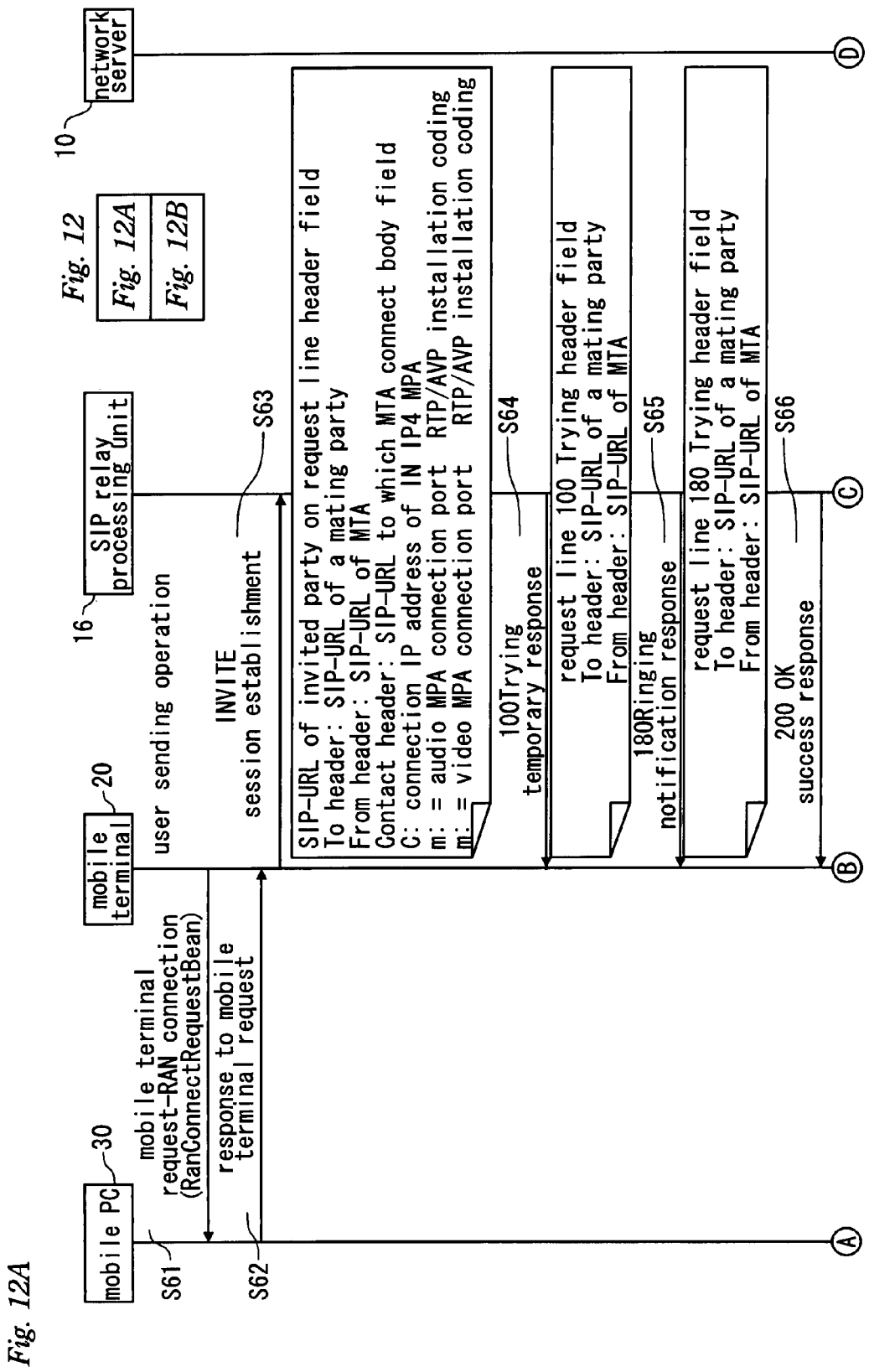

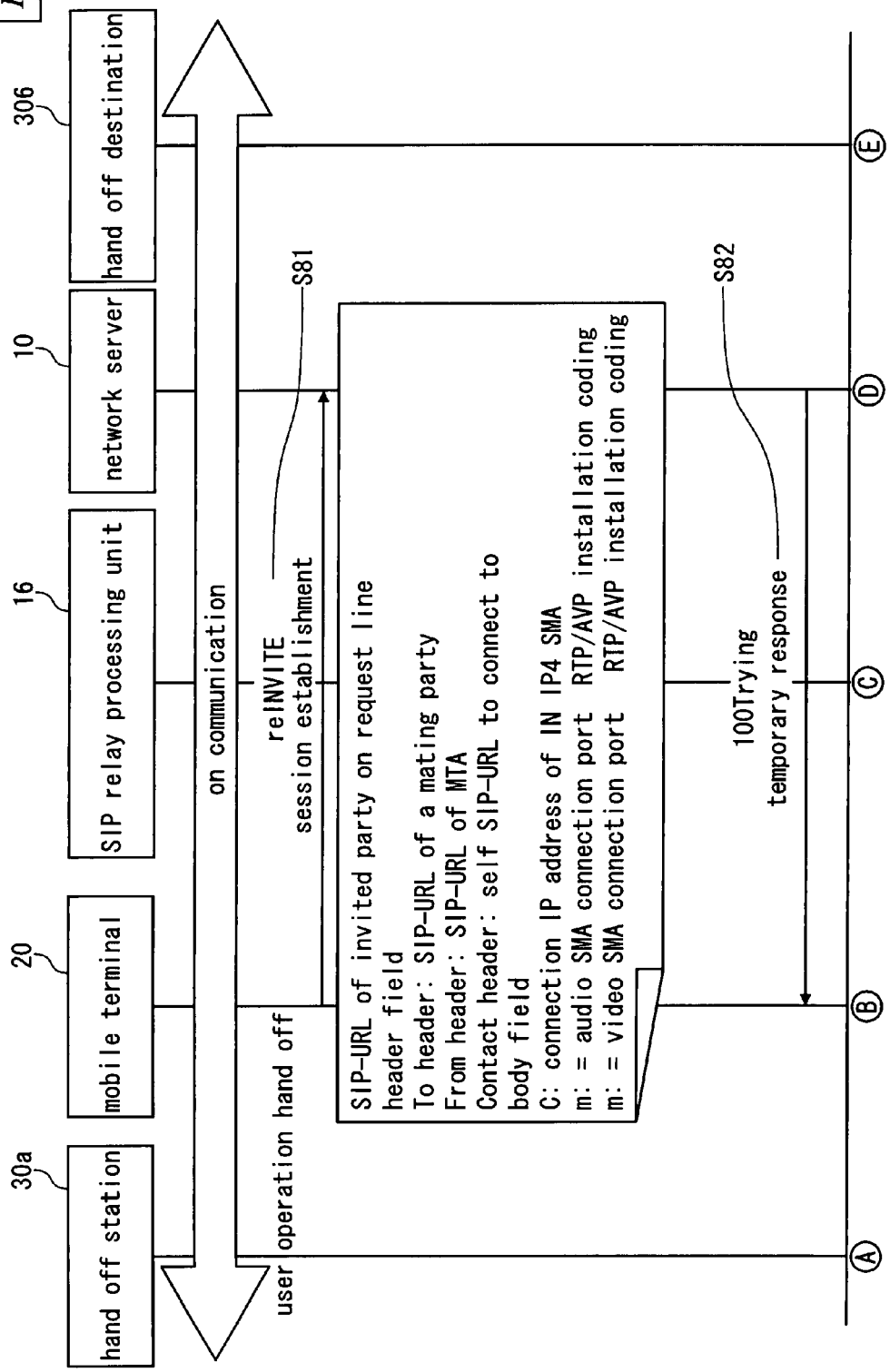

Fig. 15

| UPI examples | meta data | meaning of location |
|---|---|---|
| UPI://nict/3f/301room-rp/(2344.243.324) | -rp | shared environment |
| UPI://nict/2f/205-hm/ | -hm | home environment |
| UPI://nict/3f/302-br/ | -br | rest room |
| UPI://nict/2f/204-mr/ | -mr | conference room |

Fig. 16

| location | example of availability setting | application | quality |
|---|---|---|---|
| shared environment | ○ | video communication | high |
| | ○ | | medium |
| | ○ | | low |
| | ○ | voice communication | _ |
| | ○ | IM | _ |
| | ○ | answer phone | _ |
| home environment | ○ | video communication | high |
| | ○ | | medium |
| | ○ | | low |
| | ○ | voice communication | |
| | ○ | IM | _ |
| | ○ | answer phone | _ |
| rest room | × | video communication | high |
| | × | | medium |
| | × | | low |
| | × | voice communication | _ |
| | ○ | IM | _ |
| | ○ | answer phone | _ |
| conference room | × | video communication | high |
| | × | | medium |
| | × | | low |
| | ○ | voice communication | _ |
| | ○ | IM | _ |
| | ○ | answer phone | _ |

LOCATION INFORMATION SERVER SYSTEM AND WIRELESS COMMUNICATION SYSTEM USING THE SAME

RELATED APPLICATION

This application is a 35 U.S.C. §371 national stage filing of International Patent Application No. PCT/JP2005/003921, filed Mar. 7, 2005.

TECHNICAL FIELD

The present invention relates to a location information server system for acquiring the position and status of a terminal in a communication system which communicates by switching a plurality of communication networks. More specifically, the present invention concerns a configuration of location information server preferable for a network capable of switching different wireless communication networks continuously when executing data communication using two or more kinds of the wireless communication networks.

Currently, a variety of wireless communication networks for use for practical purposes today such as independent operating system such as wireless LAN, Bluetooth and public network system such as mobile phone and PHS, function independently while user uses them selectively depending on application, area and communication velocity.

These wireless communication networks are diversified in communication velocity, providing area and communication cost depending on their kinds and need to be switched appropriately corresponding to a place in which that network is connected without always using a particular network.

At this time, there has been demanded seamless hand over technology which handles respective systems integrally and changes over the network by selecting an appropriate network without making user conscious thereof depending on coverage of each service area and communication band which user needs while continuing communication without interruption.

For example, although mobile IP service has been proposed, introduction or prevalence thereof has not been progressed. The reason is considered to be that Internet service provider needs to install a server such as a home agent (HA) in order to achieve mobile IP and further that cost is required to secure fault tolerance, reliability and large capacity of the server because it is to be controlled centrally.

Further, unless IP subnet is changed when user moves between the Internet service providers while continuing home agent communication, the mobile IP service cannot be used effectively and thus, currently, it has been used only in roaming.

Further, the reason why the prevalence has not been progressed can be considered to be also that there are few Internet applications which need mobile communication.

As specific products currently provided, following ones can be mentioned. One of them is family of products called home server or personal server. Currently, Internet access through xDSL or FTTH has increased and these modems are placed at a number of homes. Thus, provision of additional service by adding a function to the modems has been attempted.

Currently marketed home servers are loaded with broadband router function, wireless LAN access point function, file server, print server, web server or mail server. Some types are provided with a function of distributing capture TV pictures and accumulated pictures to PC so that user can see the pictures from apart from home.

However, these servers have no function of IP phone or no function of presence for controlling communication corresponding to the condition of a terminal side.

Further, no network hand over function or service hand over function has been provided. That is, those servers aim at only home network and a function of switching an appliance while continuing communication within its internal network or switching of communication to an external network side while continuing communication has not been expected.

As a similar product, xDSL modem contained broadband router is available. These are provided by xDSL service providers and includes wireless LAN access point function and IP telephone function prepared. This enables only a conventional telephone to be connected for use, so that it has been used for only the reason of cheap communication cost.

It cannot transmit sound or video communication to any cordless handset or PC in the form of IP data making the best use of original characteristics of the IP phone. Likewise, it cannot transfer sound/video communication received from outside to any appliance on the external network as well as an internal appliance. The aforementioned presence function is not provided.

Further, a server for realizing the mobile IP has been provided. These install home agent servers on corporate network of companies as well as Internet service providers. When a server for controlling collectively goes down, all users are influenced. Although the mobile IP is capable of network hand over across a sub-net, hand over between terminals has not been achieved.

Further, the presence server has been provided and if this server goes down, all users are influenced because it controls presence information of each user collectively. There is a problem that some users may have feeling of dislike thereto from viewpoints of privacy protection.

This inventor has proposed a variety of methods for achieving hand over between networks and hand off of service through patent documents 1 to 3.

Patent document 1: PCT/JP03/14727
Patent document 2: PCT/JP03/14724
Patent document 3: PCT/JP03/14723

The patent document 1 has proposed a wireless communication system which establishes basic access network and wireless access network at the same time using at least two or more kinds of wireless communication networks. While the basic access network carries out signaling communication concerned with continuous communication switching control, the wireless access network carries out other data communication than signaling communication. According to this system, continuous network switching can be achieved by setting multi-cast of feeding data to the basic access network temporarily.

The patent document 2 has proposed technology which enables switching to an optimum network by sending position information to a server with a position acquiring means equipped on a wireless communication terminal in the same configuration as the above-described wireless system.

The patent document 3 has proposed a method for signaling communication for acquiring network information available based on position information of a terminal in order to realize continuous communication switching in the basic access network and a communication based on SIP (Session Initiation Protocol) which carries out exchange of subscription request signals between the terminals and negotiation about communication in the same configuration as the above-described wireless system. This configuration enables peer-to-peer connection by media application between the terminals.

Although each of these systems aims at solving the problems of a family of current products, both functions of hand over between networks and service hand off are controlled by independent terminals, the both cannot be operated integrally. Further, there is a problem concerning privacy because presence information is registered in shared server. Because selection not considering a condition on a receiving side is carried out when selecting an application, there exist a number of problems on usage, for example, an application which generates sound in an environment which should be kept silent is selected.

DISCLOSURE OF THE INVENTION

The present invention intends to solve problems of the above-described conventional technology and provides a location information server system capable of controlling the location information of users' terminals in a decentralized way. At the same time, the present invention aims at providing a location information server system capable of optimizing selection of a terminal and an application which starts up the service by cooperation with the server which executes signaling processing and a wireless communication system.

To solve the above-described problems, the present invention provides following location information server system.

That is, according to the invention of claim 1, there is provided a location information server system for acquiring the status of a user terminal in wireless communication network, comprising: a plurality of sensor means capable of communicating through a network; a priority database to location information from each sensor means; location information selecting means for selecting a location information having a high priority from overlapping location information with reference to the database; and a sensor information integration processing means which integrates acquisition information from at least two sensor means of the sensor means for acquiring the location information and the sensor means for acquiring identification information of a user terminal.

In the location information server system, information from each means is accumulated in the location information server as terminal location information database and the location information server means includes a location information providing means capable of providing the sensor information to a predetermined network server corresponding to the user terminal.

According to the invention of claim 2, the location information server system is characterized in using at least any receiving means for floor sensor information which detects RFID tag information, wireless LAN access point identification information, ultrasonic wave sensing information and a position on floor of user, as the sensor means.

According to the invention of claim 3, the location information server system is characterized in including a communicating means capable of receiving location information from user terminal so as to receive measuring information of GPS receiver, direction sensor and acceleration sensor disposed at the user terminal.

The invention of claim 4 provides a wireless communication system having the above-described location information server system.

That is, there is provided the wireless communication system capable of establishing connection of basic access network capable of signaling communication concerned with continuous communication switch control and access network for carrying out other data communication than the signaling communication at the same time using at least two or more kinds of communication networks including wireless communication network, the wireless communication system including wireless communication terminal, basic access network terminal, network server and location information server system.

The wireless communication terminal includes: an access communication processing unit capable of communicating with at least two or more kinds of communication networks including the wireless communication network; each network device corresponding to each communication network; a passage and device for communicating with the basic access network terminal; and a basic access network client processing unit having client function in signaling communication concerned with connection/disconnection processing request relative to at least an access network acquired through the communication pathway.

When communication with the access network is switched continuously, the network server notifies the basic access network terminal of a candidate access network to be switched and comprises management information database having user information and device information concerning the basic access network terminal and the wireless communication terminal and the basic access network server processing unit which controls the signaling communication for communicating its statue with the basic access network terminal and registration/updating processing of the basic access network terminal.

The basic access network terminal includes: basic access network signaling processing unit which carries out signaling communication with the basic access network server processing unit of the network server and with the basic access network client processing unit of the wireless communication terminal; and a device control unit which at least controls the communication device.

The above-described wireless communication system is equipped with the location information server system. The location information server system includes at least a plurality of sensor devices capable of communicating through communication network or basic access network and location information server, the location information server having a location information acquisition processing unit for acquiring the basic access network terminal position and wireless communication terminal position with the sensor device, a terminal position information database storage unit which accumulates and stores the acquired information and a location information communication processing unit which communicates the content of the terminal position information database with the basic access network signaling processing unit of the network server.

According to the invention described in claim 5, the location information server comprises: a priority database relative to location information from each sensor means; location information selecting means for selecting a location information having a high priority from overlapping location information with reference to the database; and a sensor information integration processing means which integrates acquisition information from at least two sensor means of the sensor means for acquiring the location information and the sensor means for acquiring identification information of the basic access network so as to acquire the basic access network terminal position or wireless communication terminal position, wherein information from each means is accumulated in the location information server as terminal location information database.

According to the invention described in claim 6, the basic access network terminal includes an application database having an application available at the time of startup of a service at the wireless communication terminal or the basic access network terminal and information of available applications corresponding to presence information concerning with the position and status of user is registered in the application database so that the information is capable of being transmitted to a communication mate through the basic access network.

Although in the above-described wireless communication system, the basic access network terminal and the wireless communication terminal are provided separately and connected with the communication pathway, they may be constructed integrally as described in claim 7 so that the communication pathway may be connected directly inside.

The above-described invention exerts following effects.

That is, by disposing the network server of the present invention at each home and company, the problems possessed by the concentrated control type are solved because the mobile IP home agent function is distributed to each server. Particularly because the location information server system of the present invention can be installed dispersingly, communication is enabled only through the basic access network thereby eliminating a necessity of transmitting information having a high degree of privacy to outside.

By equipping the wireless communication system of the present invention with this technology, the hand over function of switching a communication appliance while continuing communication under a control from the basic access network terminal and service hand off can be provided at the same time. Then, information can be provided using an optimum application corresponding to the location and status of user at the time of switching.

BRIEF DESCRIPTION OF THE DRAWINGS

FIG. 15 shows an example of data table in location information server.

FIG. 16 shows an example of data table in the location information server.

DESCRIPTION OF REFERENCE NUMERALS

1: communication system, 10: network server, 20: mobile terminal, 30: mobile PC, 40: fixed terminal, 50: location information server

BEST MODE FOR CARRYING OUT THE INVENTION

Hereinafter the embodiment of the present invention will be described in detail with reference to the drawings. In the meantime, upon carrying out the invention, the present invention is not restricted to as described below but may be modified or applied arbitrarily. In the meantime, although a configuration of the wireless communication system in which the location information server is introduced will be disclosed, the present invention can be provided through only the location information server system.

Figure 1:
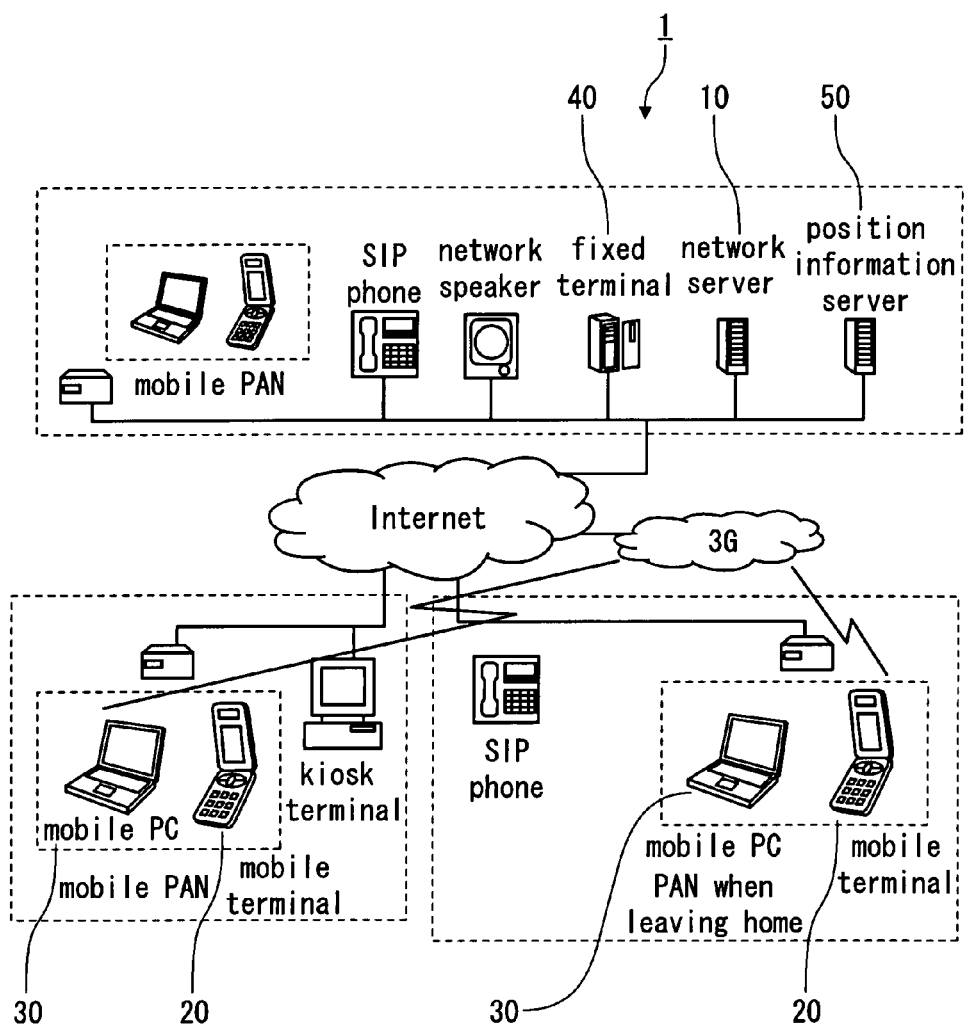
FIG. 1 is an overall configuration diagram of communication system according to the present invention.

FIG. 1 is an overall diagram of the wireless communication system (1) of the present invention. This system is constructed of mainly a network server (10) for realizing ubiquitous wireless communication environment, basic access network terminal (hereinafter referred to as mobile terminal) (20) and wireless communication terminal (hereinafter referred to as mobile PC) (30).

The network server (10) is connected to a network through wired LAN. It controls mainly signaling communication to be connected from mobile terminal (20) through basic access network and SIP relay processing.

When a position acquisition request is made from the mobile terminal (20), the position of each mobile terminal (20) is specified from information of wireless LAN access point and provided.

At the same time, hard disk of the server includes database, which holds user information, mobile terminal (20) information and access authority information.

The mobile terminal (20) is a terminal device supposed to be always carried in a single quantity by a single person. Currently, the mobile phone has been prevalent and it is preferable to load this function on the mobile phone.

The mobile terminal (20) constitutes the network server (10) and basic access network with, for example, 3G and wireless LAN so that it is always connected.

The mobile PC (30) is constituted of a notebook personal computer which corresponds to a mobile terminal (20) only one to one. According to the present invention, the communication system includes at least wireless communication system and is provided with communication means such as wireless LAN device and PHS network different from the basic access network. At the same time, it may possess wired LAN and when it is available, the wired LAN may be used as access network.

Further, communication passage with a mobile terminal such as Bluetooth and wireless LAN is provided. Consequently, the signaling communication is carried out through the communication passage.

It is presumed that the mobile PC (30) moves together with user and the position of the mobile terminal is handled as a position of the mobile PC. Thus, because no signaling communication is carried out while it is not connected to the mobile terminal, the wireless communication of the present invention is not actuated.

Figure 2:
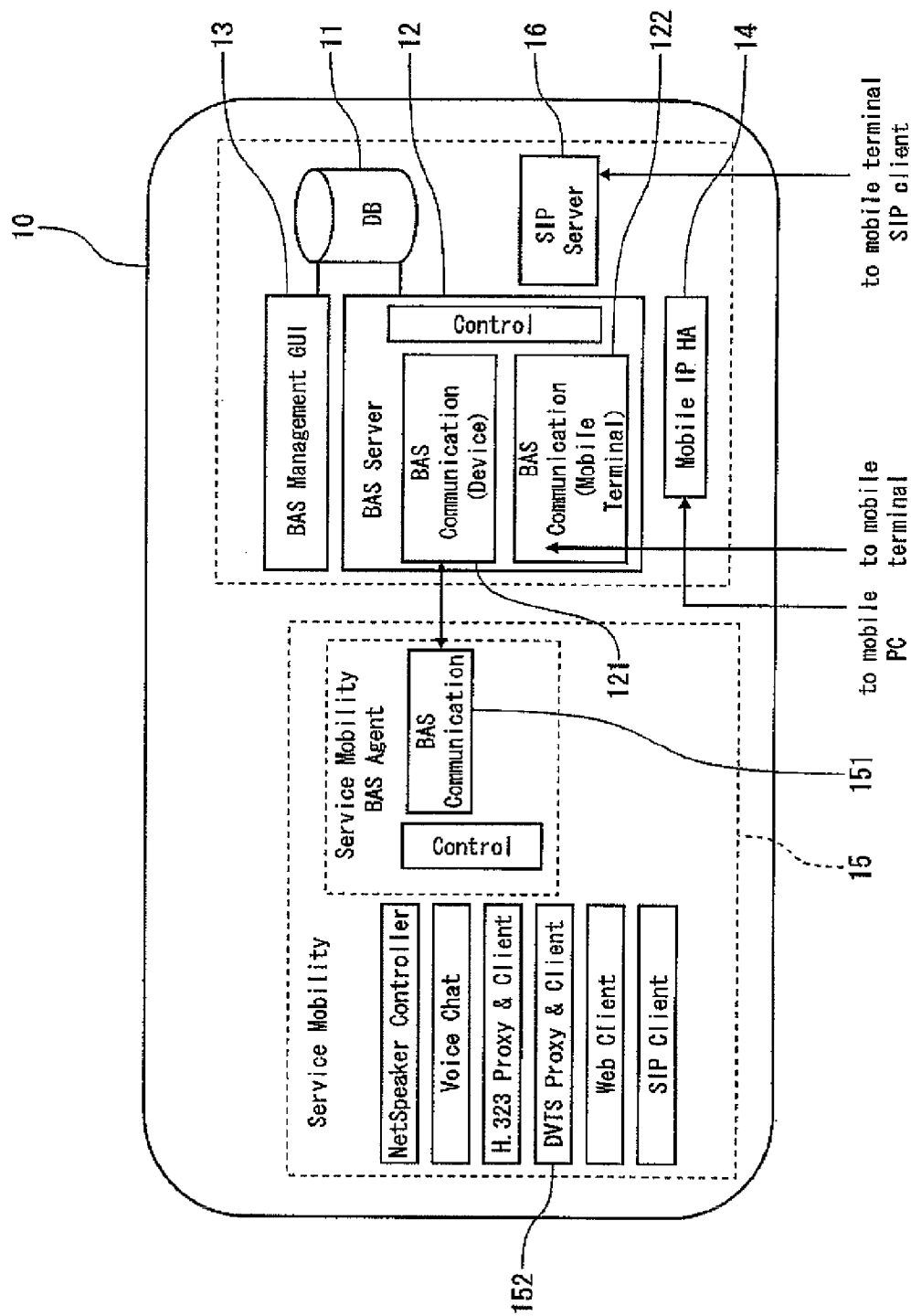
FIG. 2 is a configuration diagram of the network server of the present invention.
Figure 3:
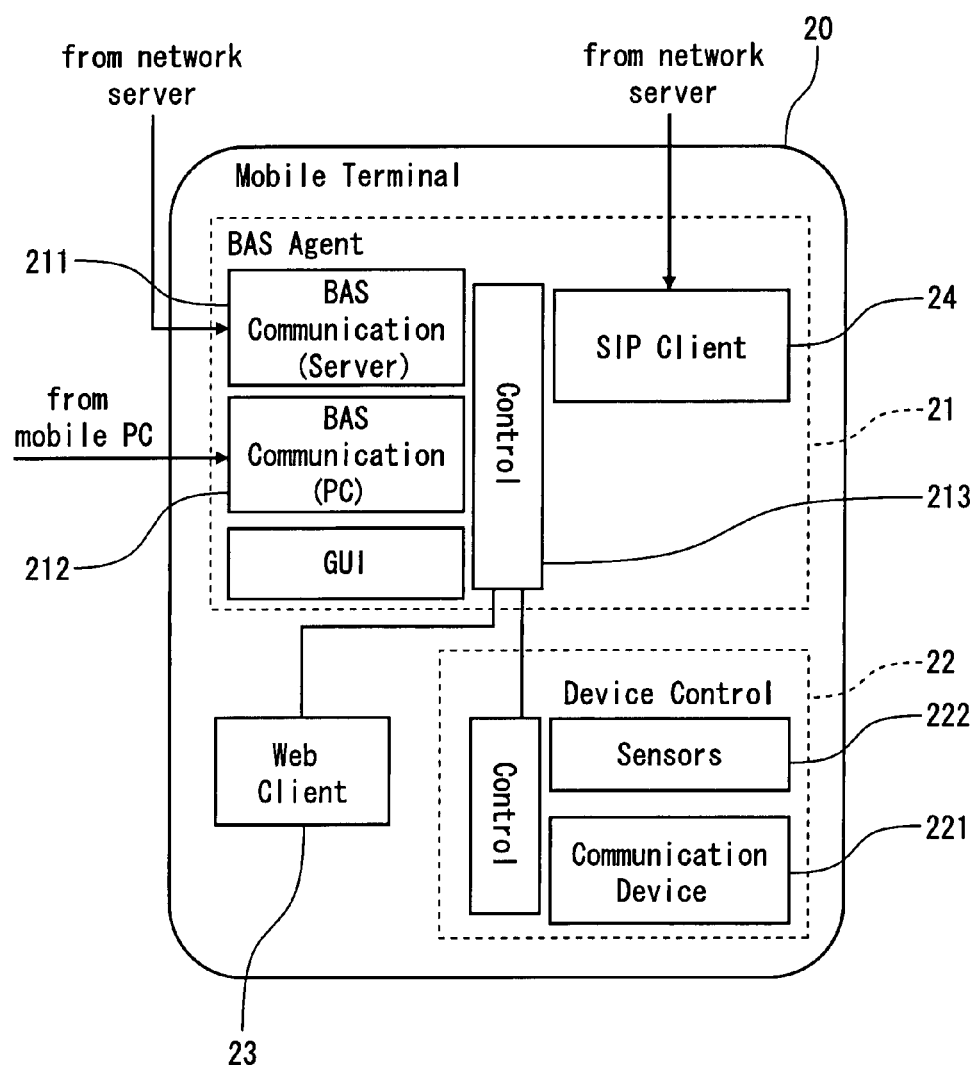
FIG. 3 is a configuration diagram of a mobile terminal of the present invention.
Figure 4:
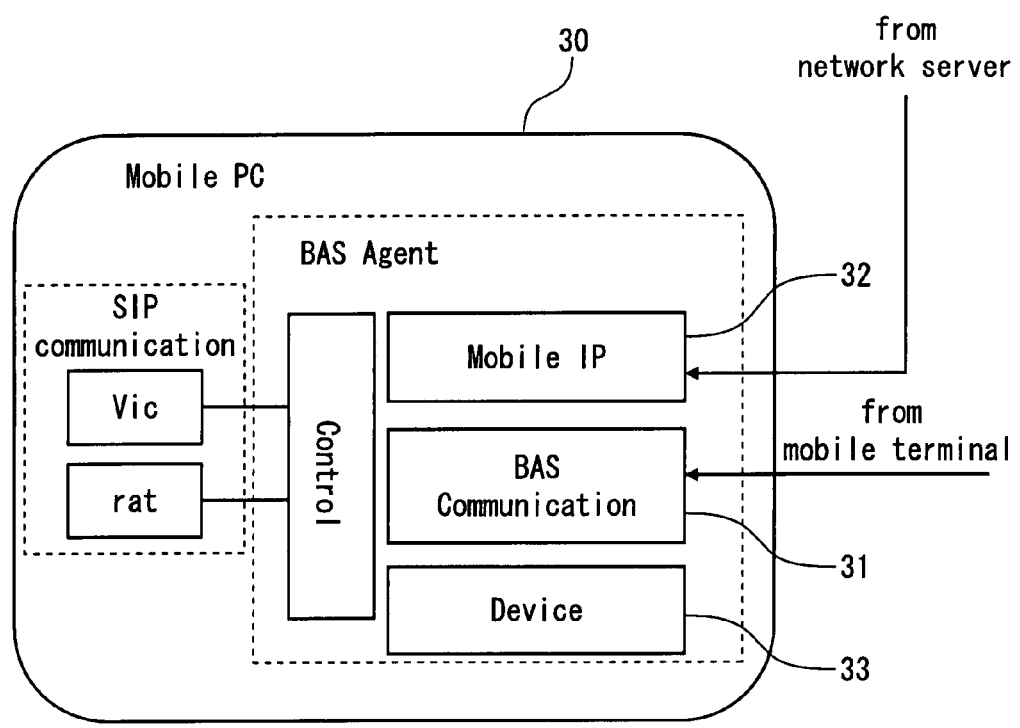
FIG. 4 is a configuration diagram of a mobile PC of the present invention.

An operation of each node in the communication system (1) will be described in detail. FIGS. 2 to 4 are configuration diagrams of the network server (10), the mobile terminal (20) and the mobile PC (30) of the present invention.

The network server (10) includes a management information database (11) having user information and device information concerning the user information and basic access network terminal and basic access network server processing unit (12) for carrying out communication processing of the basic access network.

Further, user interface (13) for management of the basic access network is provided. Setting by the interface is stored in the hard disk (11).

Communication device (121) with 3G network and communication processing unit (122) for carrying out signaling communication with the communication device (121) are disposed in the basic access network server processing unit (12) so as to enable communication with the mobile terminal (20).

Mobile IP agent (14) is provided as a packet relay processing unit which is capable of communicating with a wireless communication terminal using an access network and relays a data stream packet to be transmitted to the wireless communication terminal. Consequently, the mobile PC (30) can carry out IP based continuous seamless communication.

As shown in FIG. 3, the mobile terminal (20) is provided with a basic access network signaling processing unit (21) and a device control unit (22). The basic access network signaling processing unit (21) includes a server communication processing unit (211) which communicates with the basic access network server processing unit (12) of the network server (10) and a mobile PC communication processing unit (212) which carries out PAN communication with the mobile PC (30). These are operated cooperatively under a control unit (213).

The device control unit (22) is provided with a sensor (222) for acquisition of positions of a communication device (221) and terminal. Then, the communication device (221) realizes use of mobile phone by for example 3G. An acceleration sensor, a direction sensor, GPS receiver and the like are provided as sensors (222) in order to acquire a position and direction of user.

Further, the mobile terminal (20) is provided with a web client (23) for access to the web so that the web can be accessed by the terminal.

As shown in FIG. 4, the mobile (30) is provided with a PAN communication processing unit (31) which communicates with the basic access network signaling processing unit (21) of the mobile terminal (20). This PAN communication processing unit (31) forms PAN with the mobile PC communication processing unit (212) of the mobile terminal (20) so as to enable transmission of the signaling information. The mobile IP processing unit (32) is connected to the mobile IP agent (14) of network server.

To use the wireless LAN, SSID of an access point is scanned at a specified cycle so as to grasp an available access point and is notified to the mobile terminal (20) through the PAN.

Further, a communication device (33) which constitutes physical layer for connecting with an access network containing a plurality of wireless communication networks is provided.

The wireless communication system is equipped with a location information server (50) of the present invention as shown in FIG. 1. The location information server (50) communicates with the basic access network server processing unit (12) using the basic access network. The location information platform (17) shown in FIG. 2 is this communication pathway.

The platform (17) manages information about devices in the neighborhood and user position in the location information server (50) according to information of sensors buried at plural places of the wireless communication system environment and GPS receivers and sensor of the mobile terminal (20).

The network server (10) supports hand over between networks of the mobile terminal (20), authentication to neighboring terminals of user and session hand over from the mobile terminal (20).

When the location information server (50) and the mobile terminal (20) cooperate through the network server (10), hand over between networks corresponding to the position and condition of user, finding of a neighboring terminal, authentication and hand over between the terminals are enabled.

Figure 5:
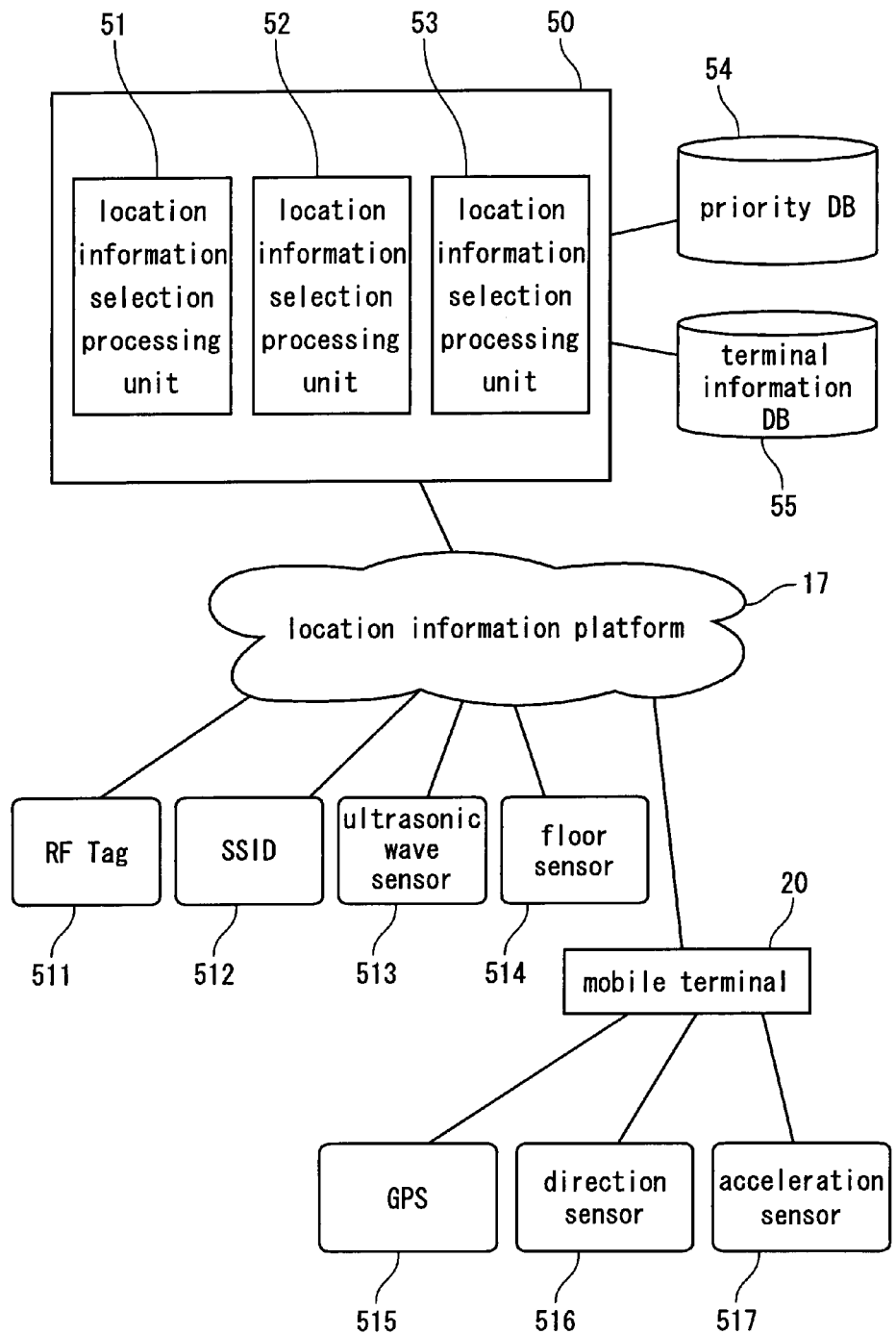
FIG. 5 is an overall configuration diagram of location information server system of the present invention.

FIG. 5 shows an overall configuration diagram of the location information server system. As shown in the Figure, this server (50) is connected to the location information platform (17) using the basic access network and the server is provided with a location information selection processing unit (51), a sensor information integration processing unit (52) and a location information providing unit (53).

Further, a priority database (54) and a terminal information database (55) are stored in the server (50) as storage means.

A plurality of sensor means is provided on the location information platform. That is, they include RF tag receiver (511) for outputting detection information when user tag is detected using electric wave, wireless LAN access point (512) using a fact that the position of a terminal can be detected according to SSID of the wireless LAN access point, ultrasonic wave sensor (513) for detecting a man or the like by changes of reflection of ultrasonic wave and floor sensor (514) for specifying the position by sensing body weight.

Further, the location information platform (17) can communicate with the mobile terminal (20) because it is a basic access network and can use measurement information from a GPS receiver (515), direction sensor (516) and acceleration sensor (517) provided on the mobile terminal (20).

In this way, the information acquired by the wireless communication terminal is transmitted to the mobile terminal (20) through the PAN and that information and location information acquired from each sensor of the mobile terminal are transmitted to the location information server (50) through the location information platform (17). A location is calculated by the location information server (50) and again transmitted to the mobile terminal (20) through the network server (10) and the basic access network. Likewise, information concerning a neighboring terminal described later is sent back to the mobile terminal (20) from the location information server (50).

Each information is used as follows.

When detecting the position with the RF tag and wireless LAN, if the sensor accuracy of the RF tag is high, the priority of the RF tag is preliminarily and high recorded in the priority database (54). Consequently, the position information selection processing unit records information of the RF tag in the terminal information database (55) as location information when acquiring the both.

The floor sensor and ultrasonic wave sensor cannot distinguish the terminals although their detection positions are extremely accurate. Then, the sensor information integration processing unit (52) can determine an accurate position of the terminal by obtaining terminal information with other sensor, for example, RF tag and integrating the information. The location information server (50) always accumulates location information of each terminal in the terminal information database (55) and waits for inquiry from the network server (50).

Upon inquiry, the location information providing unit (53) sends information through the location information platform (17).

Figure 6A:
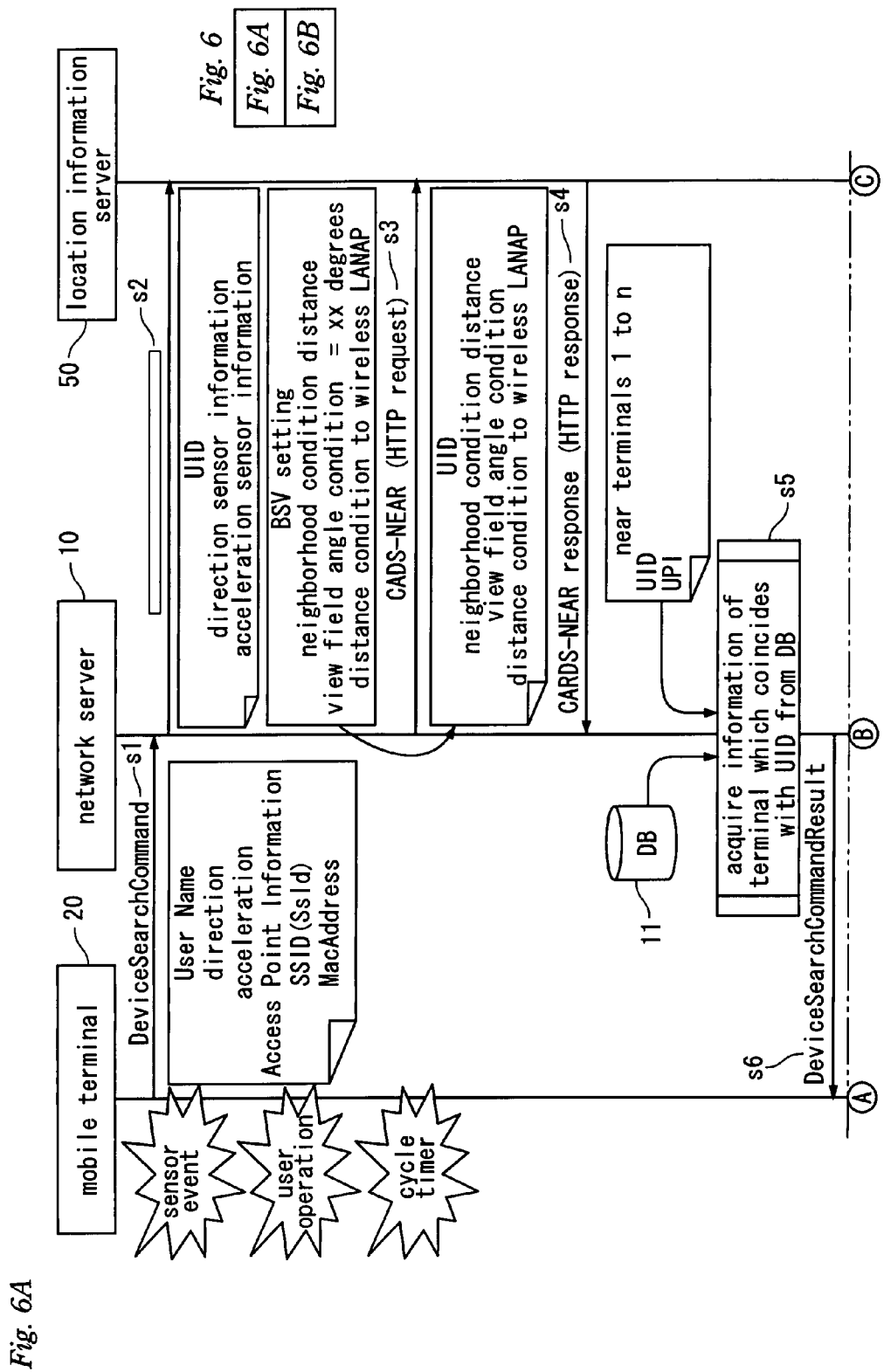
FIG. 6 shows a sequence at the time of acquisition of an adjacent terminal.
Figure 6B:
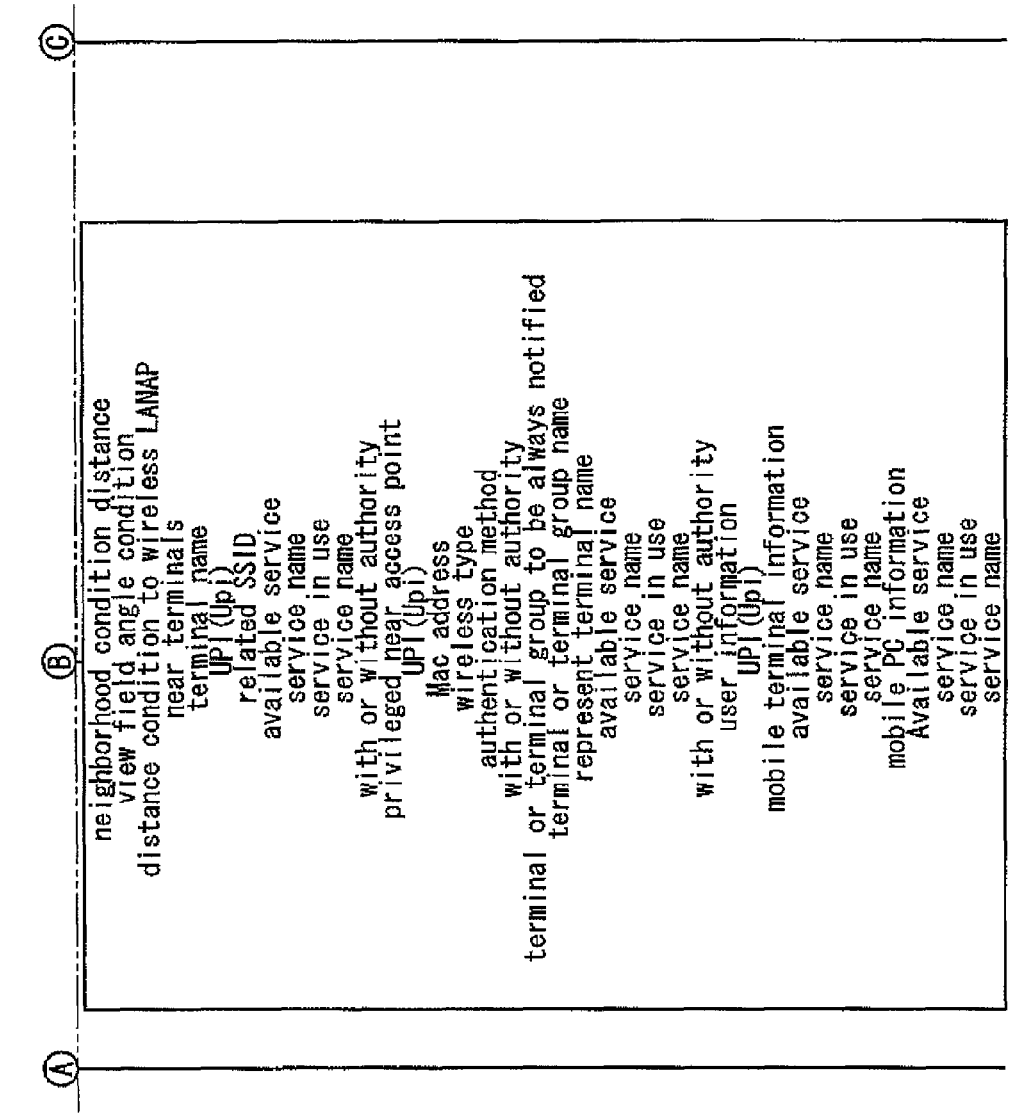

By providing with the location information server (50), information of neighboring terminal can be provided according to a sequence shown in FIG. 6 when a request for acquiring the neighboring terminal is made from the mobile terminal (20).

A timing of requesting to acquire the neighboring terminal at the mobile terminal (20) is considered to be when a sensor provided on the mobile terminal acquires information or when user operates to request for the acquisition or it can be considered that such a request is made cyclically.

At this time, the direction of the mobile terminal (20), acceleration and SSID of the wireless LAN access point on use are transmitted (s1). When the network server (10) receives this through the basic access network, user identification number and sensor information are notified the location information server (50) of through UDP (s2). Next, a request (s3) of neighboring terminals is sent through HTTP.

At this time, in the network server (10) neighborhood conditions, for example, a distance from the terminal, visual field angle, distance up to the wireless LAN access point are generated based on the control information database (11) of the mobile terminal (20) and transmitted.

Consequently, the location information providing unit (53) extracts only a predetermined number of user identification numbers of the neighboring terminals from the terminal information database (55) and responds (s4).

The network server (10) acquires information of the terminal (s5) from the user identification number of the terminal with reference to the control information database (11) and responds to the mobile terminal (20) as neighboring terminal acquisition request response (s6).

Because detailed information including services being started up of each neighboring terminal is transmitted in this response, the mobile terminal (20) can select a neighboring terminal to be handed off while considering various factors.

Figure 7:
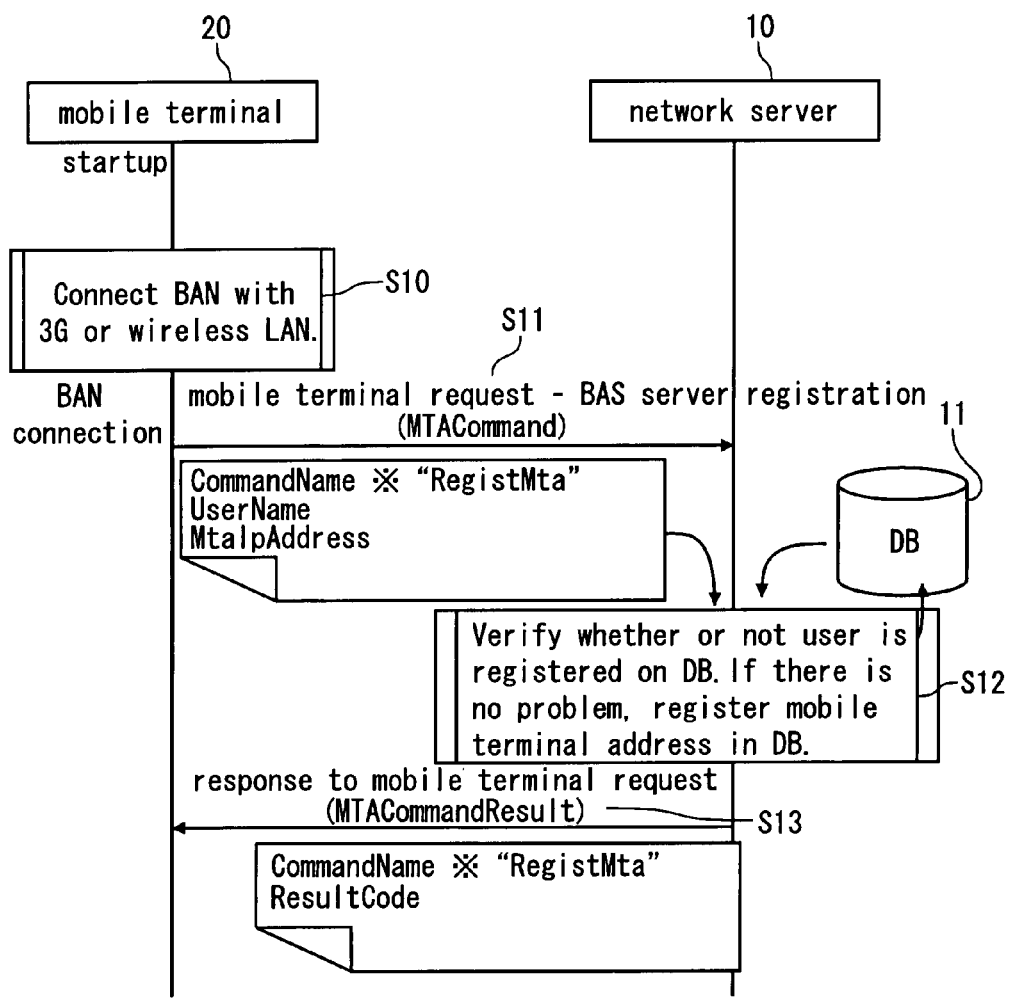
FIG. 7 shows a sequence showing authentication of a mobile terminal (20) in the network server (10).

Other sequences on the wireless communication system will be described in detail. FIG. 7 shows a sequence showing authentication of a mobile terminal (20) in the network server (10). First, when the mobile terminal is started, connection processing (S10) of the basic access network of 3G or the like is carried out and address registration request of the mobile terminal is executed to the network server (10) (S11).

The network server (10) verifies whether or not that user is registered with reference to the control information database (11) (S12) and if it is registered, its address is registered on the database (11). Then, a response to the request is made (S13).

Figure 8A:
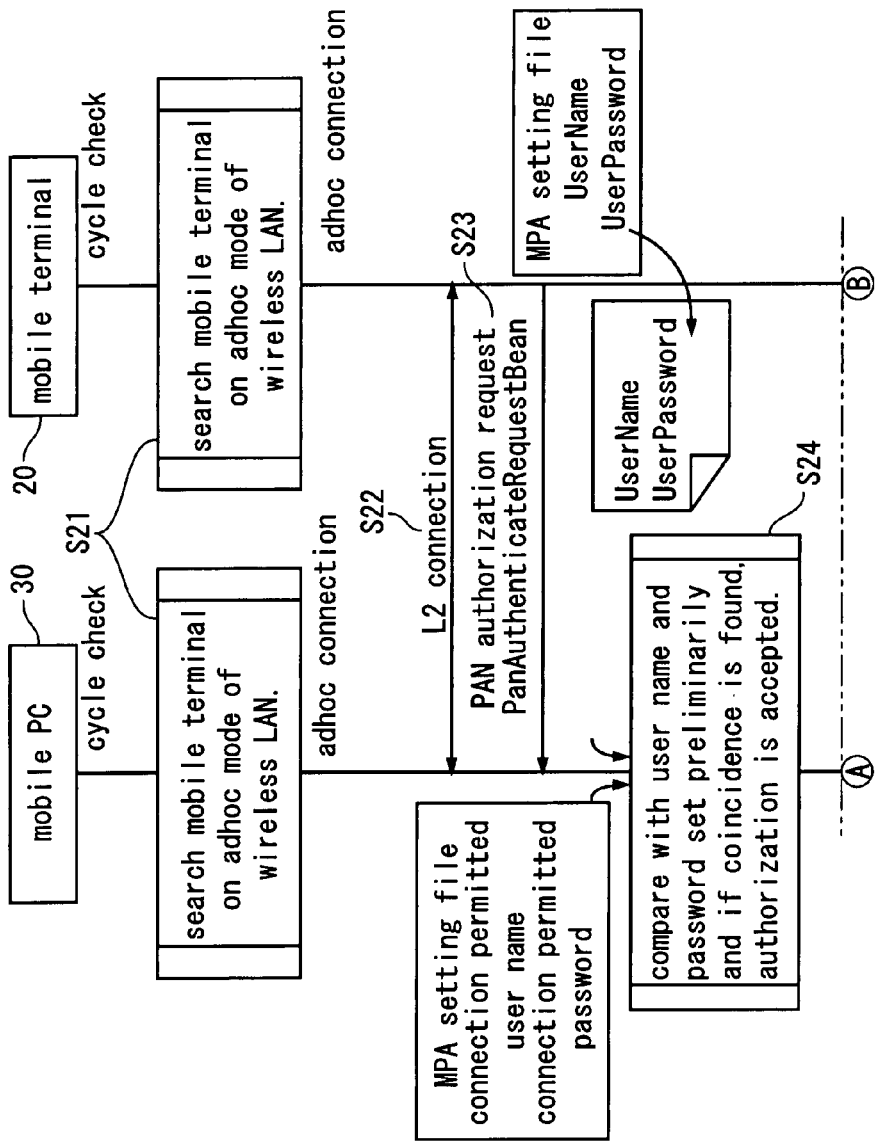
FIG. 8 shows a sequence of building of PAN.
Figure 8B:
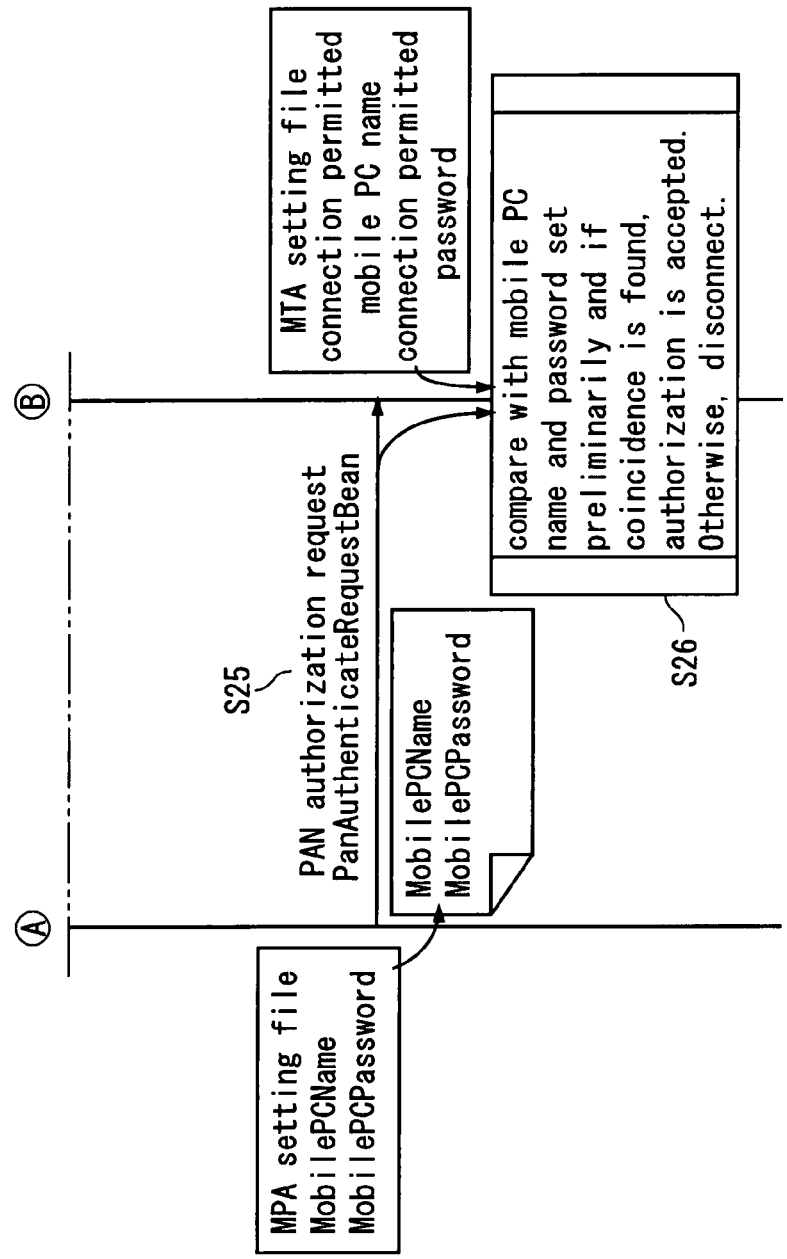

Next, a sequence for establishing of the PAN between the mobile terminal (20) and the mobile PC (30) is shown in FIG. 8. In both, according to the present invention, the wireless LAN is started on known adhoc mode and a each-other cyclic search (S21) is repeated.

Then, after it is found, adhoc connection (S22) is carried out according to a predetermined connecting procedure. After that, authentication request (S23) of the PAN is carried out from the mobile terminal (20) and a user name and password stored therein are sent to the PC (30).

The mobile PC (30) collates with a user name/password set preliminarily and when the user name and password coincide, it authenticates (S24) and at the same time, sends back a stored mobile PC name and password together with an authentication result (S25).

After the sending back, the mobile terminal (20) collates with a mobile PC permitted to be connected thereto and its password and if they coincide, it authenticates (S26) so that construction of the PAN is completed. Unless they coincide, communication is interrupted.

By authenticating the mobile PC and mobile terminal between each other, confidentiality is enhanced thereby contributing to improvement of the security.

Figure 9B:
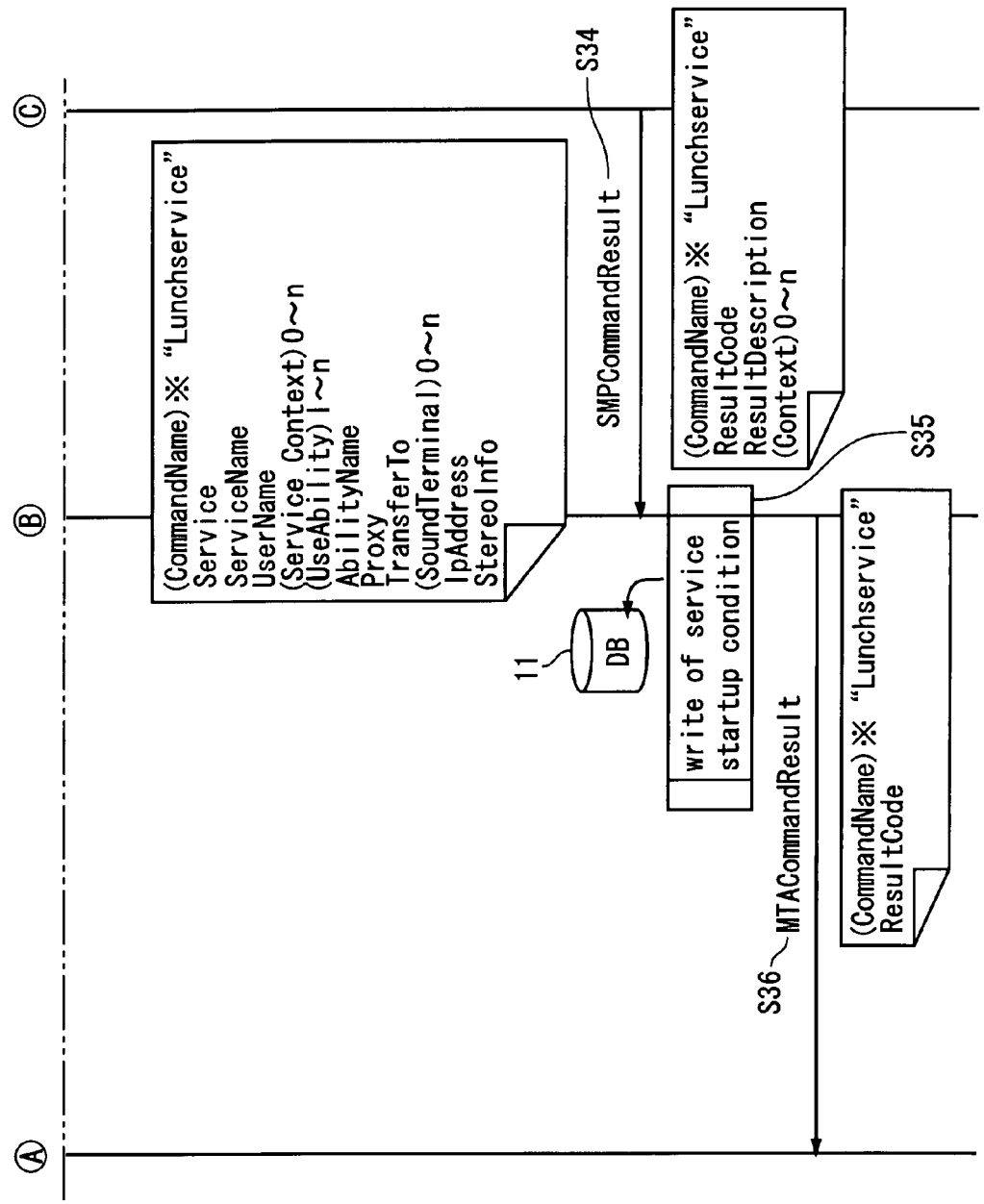
FIG. 9 shows a sequence for starting up the service without use of a relay server.

Next, a method for service hand off will be described in detail. The present invention is possible for both a structure which executes service hand off without use of any relay server and a structure using relay server. First, a sequence for service startup in the former will be described. FIG. 9 shows that sequence.

When user starts the service by operating the key of the mobile terminal (20), the mobile terminal (20) sends a service startup request (S31) to the network server (10). The basic access network is used because it is signaling information. Hereinafter, any one that is not described otherwise, is signaling information.

To the service startup request, service startup terminal, context information and other user information are transmitted.

The network server (10) verifies the user privilege of a terminal to be started up (S32), the capacity (for example, display capacity, communication velocity) of a terminal to be started up and the like with reference to the database (11) and sends a service startup request (S33) to a designated service startup terminal (40).

The present invention assumes a variety of terminals as the service startup terminals. Although this embodiment will be described using a fixed terminal (40) connected through the wired LAN, any terminal may be used if a service mobility agent processing function described later is possessed. For example, it may be connected through wireless LAN as well as the wired LAN and the SIP phone and the speaker system disclosed in the patent document 4 by this inventor may be used as well as desk top personal computer, notebook personal computer, and PDA.

Using the mobile PC (30) as the terminal is an ordinary method.

Patent Document 4: PCT/JP03/14721

After the service startup terminal (40) receives a request, the service is started up. It receives data stream from the network server (10) and executes reproduction of animation and sound.

At the same time, it sends back a response (S34) to the network server (10). The network server (10) records that service has been started in the database (11) (S35) and further sends back a relevant response to the mobile terminal (20).

The above described configuration is a case in which the service mobility agent processing function is provided at the service startup terminal (40). As described above, the present invention enables the network server (10) to select a terminal having a plurality of service mobility agent processing functions following the management information database (11).

However, in case of the above-mentioned speaker system, high grade information processing is sometimes difficult to do. Thus, a terminal having the service mobility agent processing unit may be disposed on the network.

In this embodiment, an example of equipping the network server (10) with this function will be described as an example. Although the configuration will be described more in detail here, the aforementioned fixed terminal (40) has the same configuration as this one. As shown in FIG. 2, a service relay processing unit (15) for realizing the service mobility agent processing function is provided.

The service relay processing unit (15) is provided with a communication unit (151) for communicating with the basic access network server processing unit (12). Further, various kinds of applications (152) for executing a service are provided. In case of executing the service at a fixed terminal or the like having no function of providing information transmitted from a caller or a callee as a service as it is, the service can be executed at that fixed terminal by relaying that information and converting it. In this way, upon conversion of information reproducible by the fixed terminal, it is converted by the application (152) and transmitted to the fixed terminal through communication network.

Figure 10A:
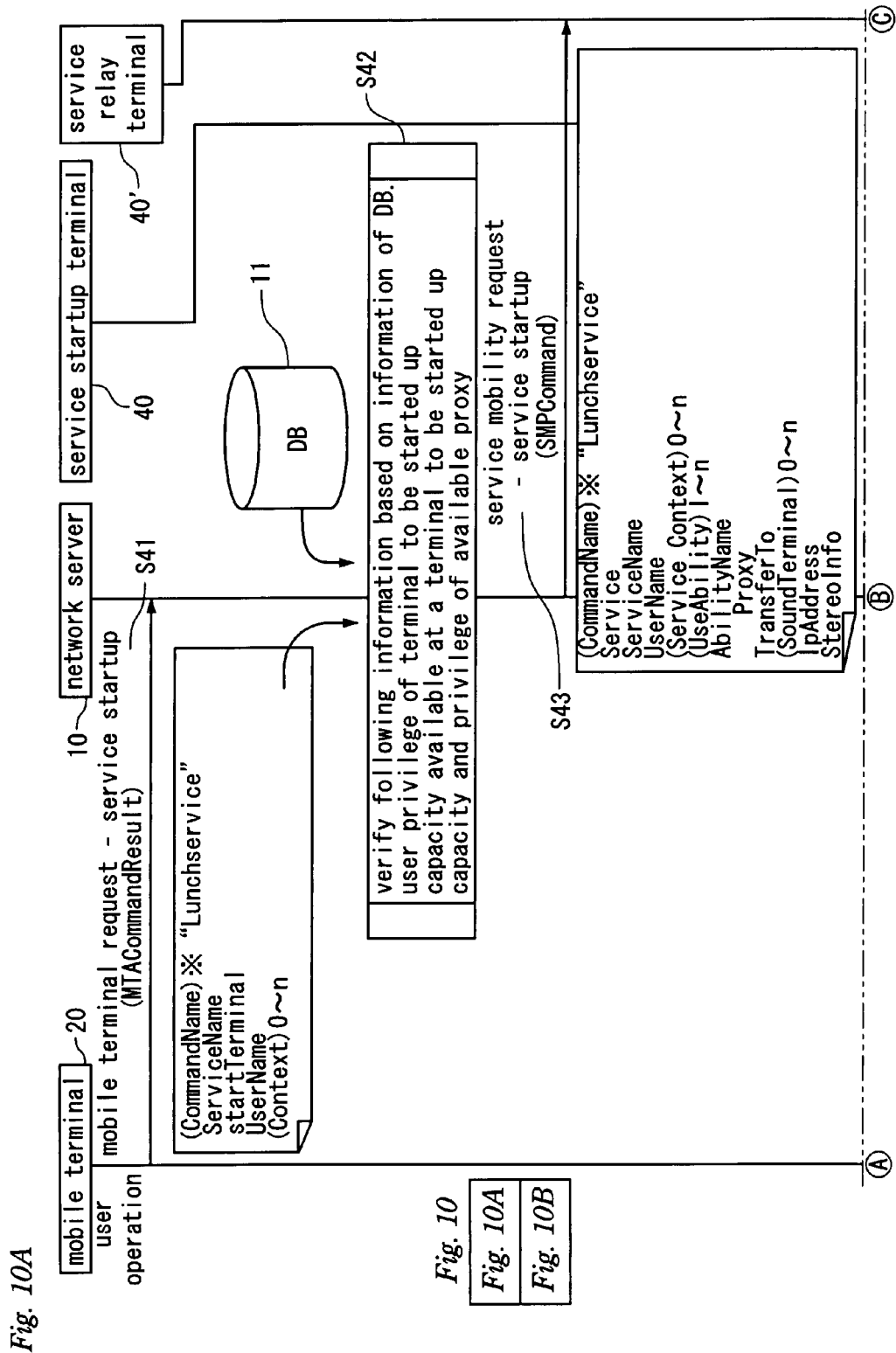
FIG. 10 shows a sequence for starting the service using the relay server.
Figure 10B:
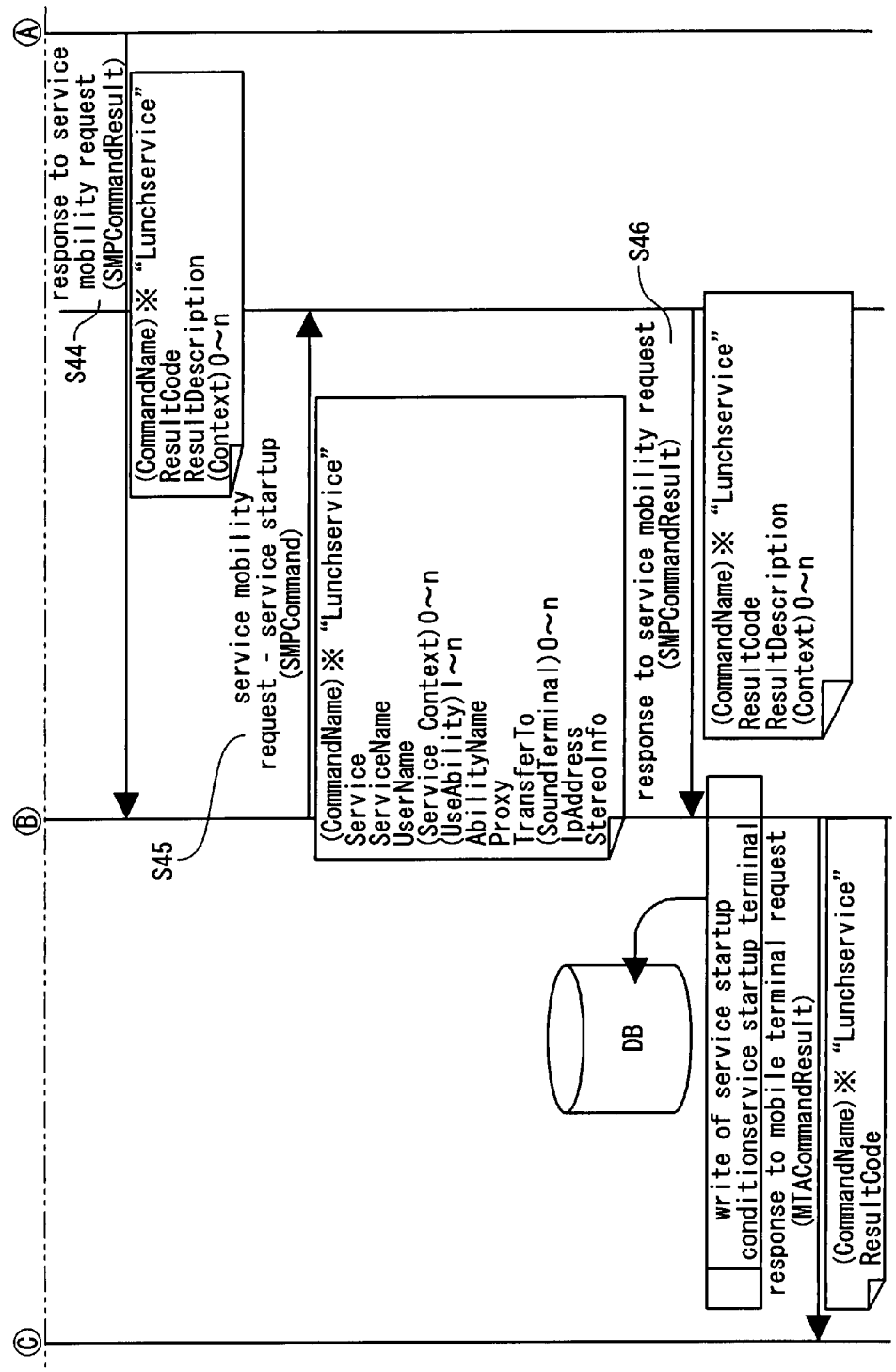

Service startup sequence using the relay server in this way is shown in FIG. 10. When user starts up the service by operating a key or the like on the mobile terminal (20), the mobile terminal (20) sends service startup request (S41) to the network server (10). The network server (10) confirms a user privilege of a terminal to be started up, capacity of the terminal to be started up (for example, display capacity, communication velocity and the like) (S42) and sends the service startup request (S43) to a relay server (40') through communication network.

When the relay server (40') receives the request, it sends back a response (S44) to the network server (10). Further, the network server (10) requests the terminal to be started up to start the service (S45) and the terminal (40) responds to it correspondingly (S46).

The network server (10) records that service has been started in the database (11) (S47) further sends back a relevant response to the mobile terminal (20) (S48).

In the above-described sequence, the fixed terminal (40) to be started up can execute reproduction processing corresponding to its own capacity by receiving converted data stream from the relay server (40').

Stop of the service is carried out by the same processing as service startup (FIG. 9) in any case. That is, service stop request is made instead of the service startup request and the network server (10) records that the service is stopped in the database (11) and terminates it.

Figure 11B:
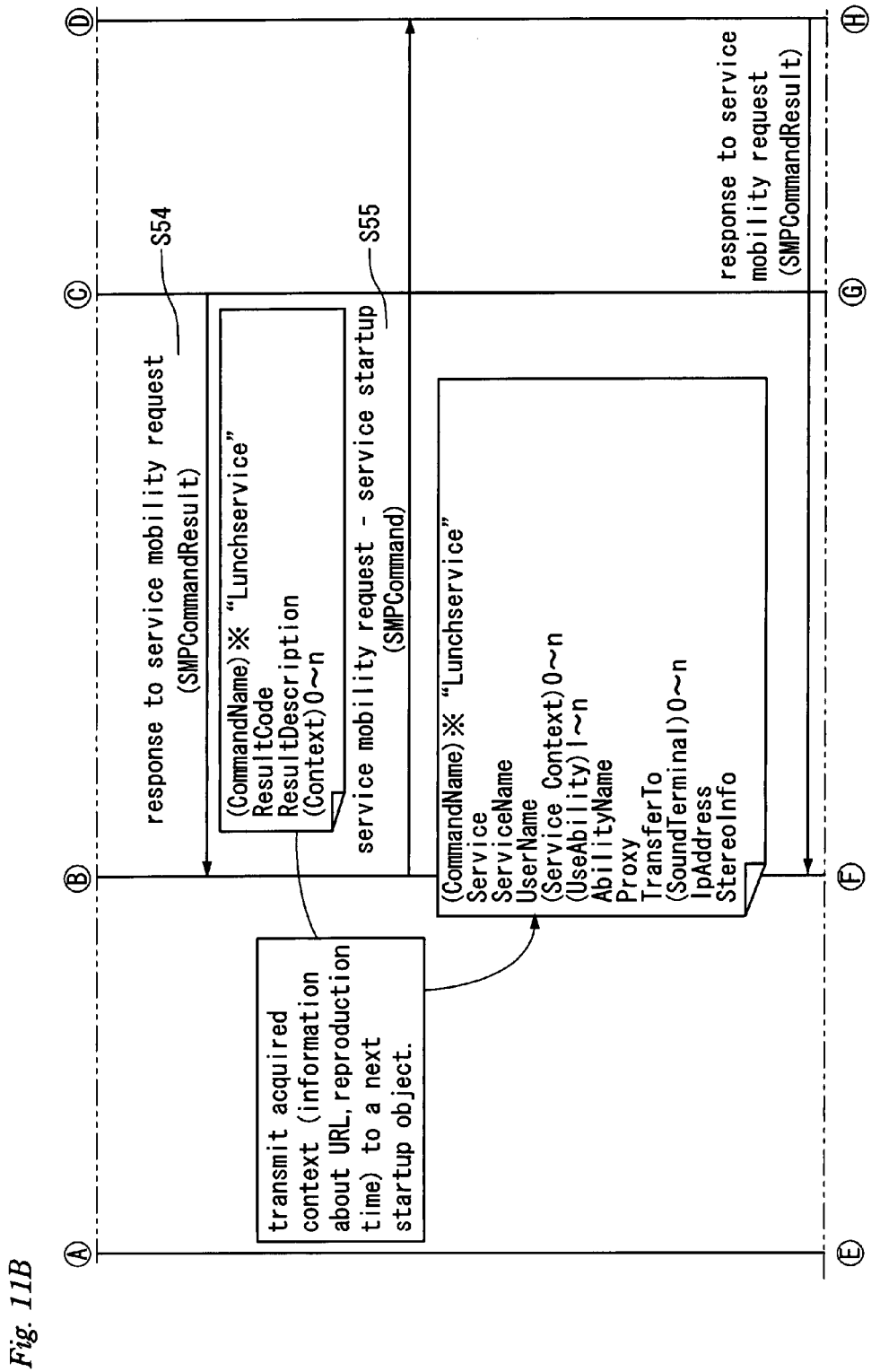
FIG. 11 shows a sequence for hand off of the service without use of the relay server.
Figure 11C:
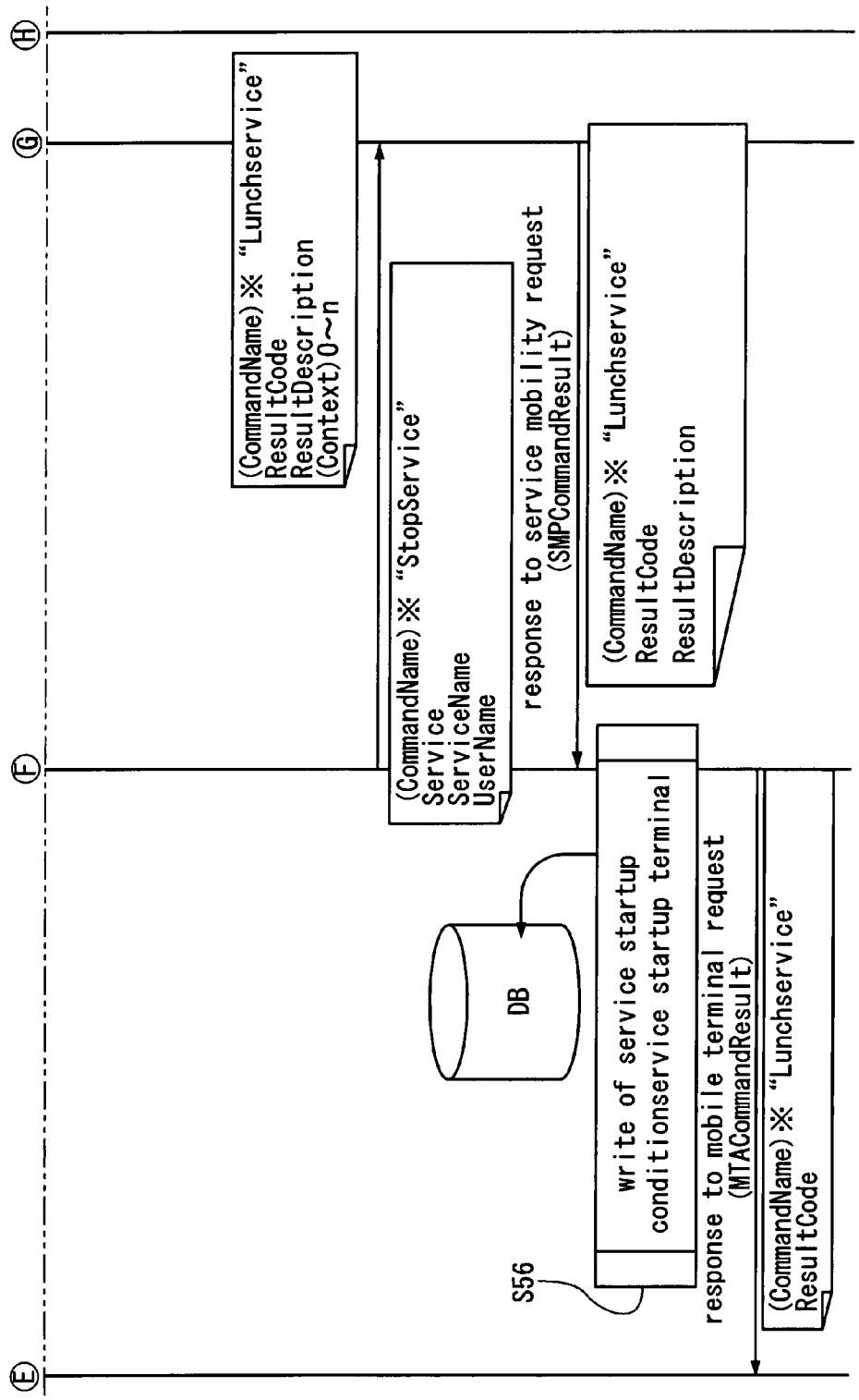

The hand off between fixed terminals which is a feature of the present invention will be described by showing its sequence in FIG. 11.

When user's operation occurs, the mobile terminal (20) sends a hand off request containing a terminal name of a transmission destination to the network server (10) (S51). After referring to the management information database (11) (S52), a context acquisition request for inquiring a sender terminal (40a) of a context on service is sent thereto (S53).

Correspondingly, the sender terminal (40a) sends a service context (URL being reviewed and reproduction time) to the network server (S54).

The network server (10) sends service startup request (S55) as well as this information to a transmission destination terminal (40b).

Following procedure is the same as the startup procedure described above and the network server (10) records stop of a service at the sender terminal (40a) and startup of service at the transmission destination terminal (40b) in the database (S56).

The present invention can provide a configuration for peer-to-peer communication between mobile PCs as well as the above-described matters. That is, communication by SIP (session initiation protocol) which negotiates over exchange and communication of a subscription request signal between terminals is carried out.

The SIP communication will be described in detail. The network server (10) is equipped with the SIP relay processing unit (16) and the mobile terminal (20) is provided with the SIP client processing unit (24).

The SIP relay processing unit (16) acts as a mere relay server when known communication with the SIP is carried out using the basic access network, so that direct voice/image communication can be executed between the terminals. Regarding operations of each processing unit, a sequence of each of three cases about transmission from the mobile PC, signal arrival to the mobile PC and communication hand off is shown.

Figure 12B:
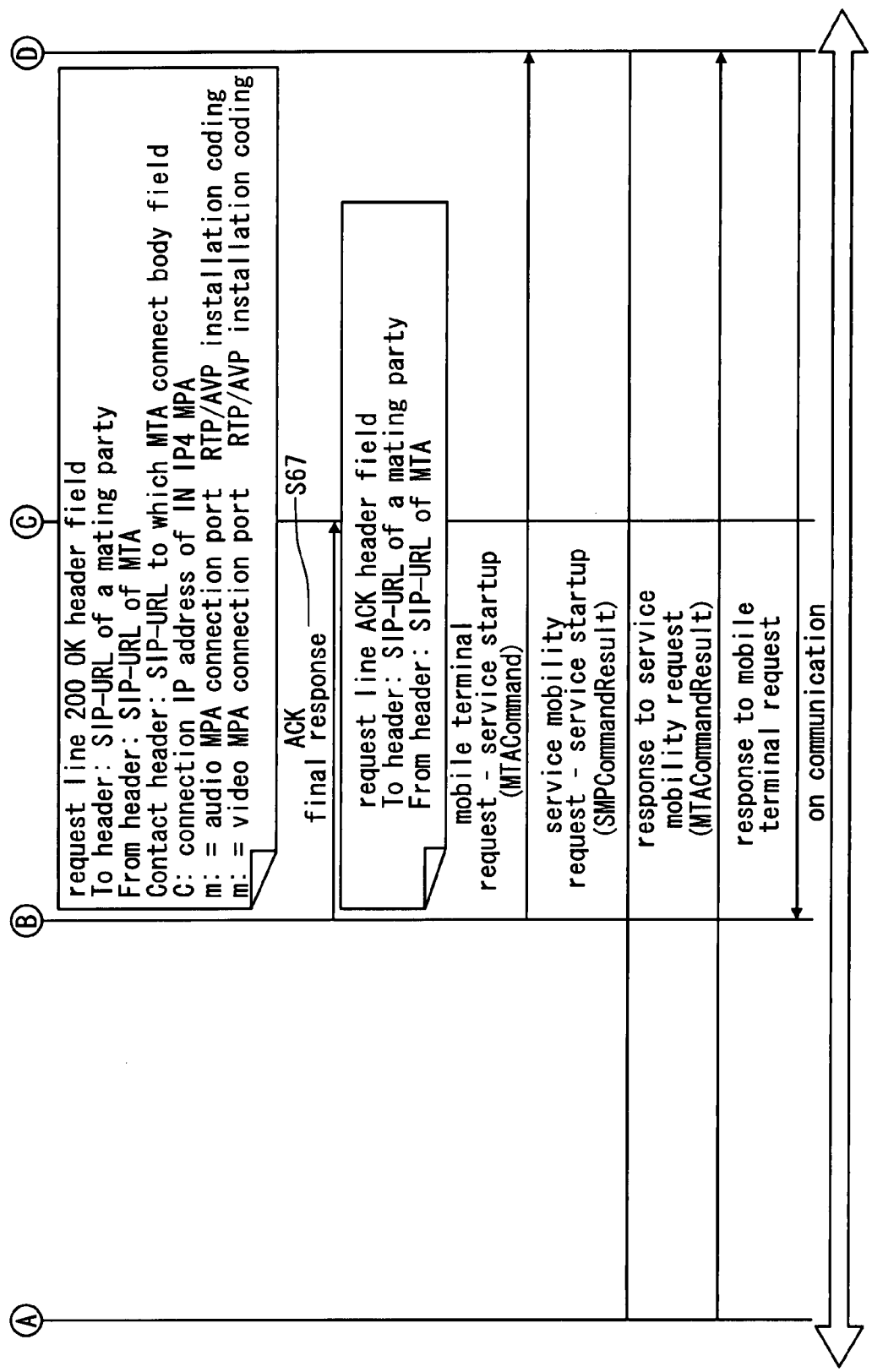
FIG. 12 shows a sequence upon transmission from a mobile PC in SIP communication.

When user wants the SIP communication in FIG. 12, if he operates for transmission on the mobile terminal (20), the mobile terminal (20) requests the mobile PC (30) for RAN (radio access network) through the PAN (S61). In the meantime, in the present invention, wireless communication terminal does not always have to use wireless network as an access network but it will be called RAN connection because at least it has a configuration of always executing wireless communication.

The RAN connection is carried out by selecting an optimum RAN from position information from the mobile terminal and notifying the mobile PC (30) thereof. As this selection method, any technology disclosed in the above-mentioned patent documents 1 to 3 may be used.

The mobile PC sends back a response (S62) to a connection request after the RAN connection. After receiving this, the SIP client processing unit (24) of the mobile terminal (20) sends a session establishment request (S63) to the SIP relay processing unit (16). This includes a variety of information such as callee SIP?URI specified by user and URI of the mobile terminal.

When the SIP relay processing unit (16) receives a temporary response from a mobile terminal which is a transmission destination, it sends back the temporary response to the mobile terminal (S64), and if a mobile terminal and a mobile PC are connected to each other through RAN so as to respond, a communication response is sent back through the SIP relay processing unit (16) (S65).

When user operates for response at a transmission destination, a success response (S66) is sent back through the SIP relay processing unit (16) and correspondingly, a final response (S67) is sent from the mobile terminal (20).

The mobile terminal makes service startup request to the basic access network server processing unit (12) of the network server (10) (S68) to start up a transmission destination. Following procedure is the same as the above-described service startup sequence, so that communication is enabled between the both mobile PCs (30).

Figure 13A:
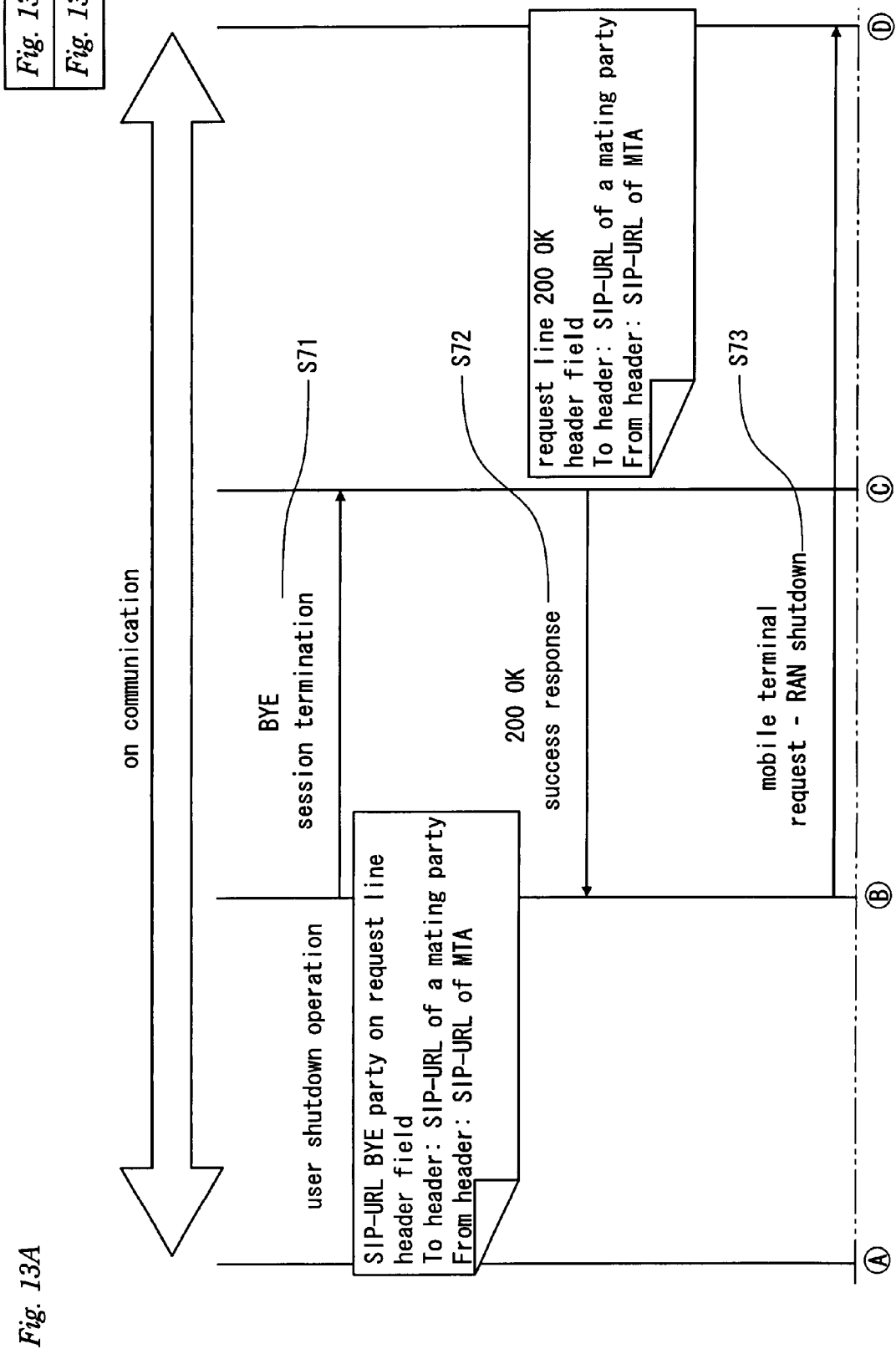
FIG. 13 shows a sequence upon shut-down after transmission from the mobile PC in SIP communication.
Figure 13B:
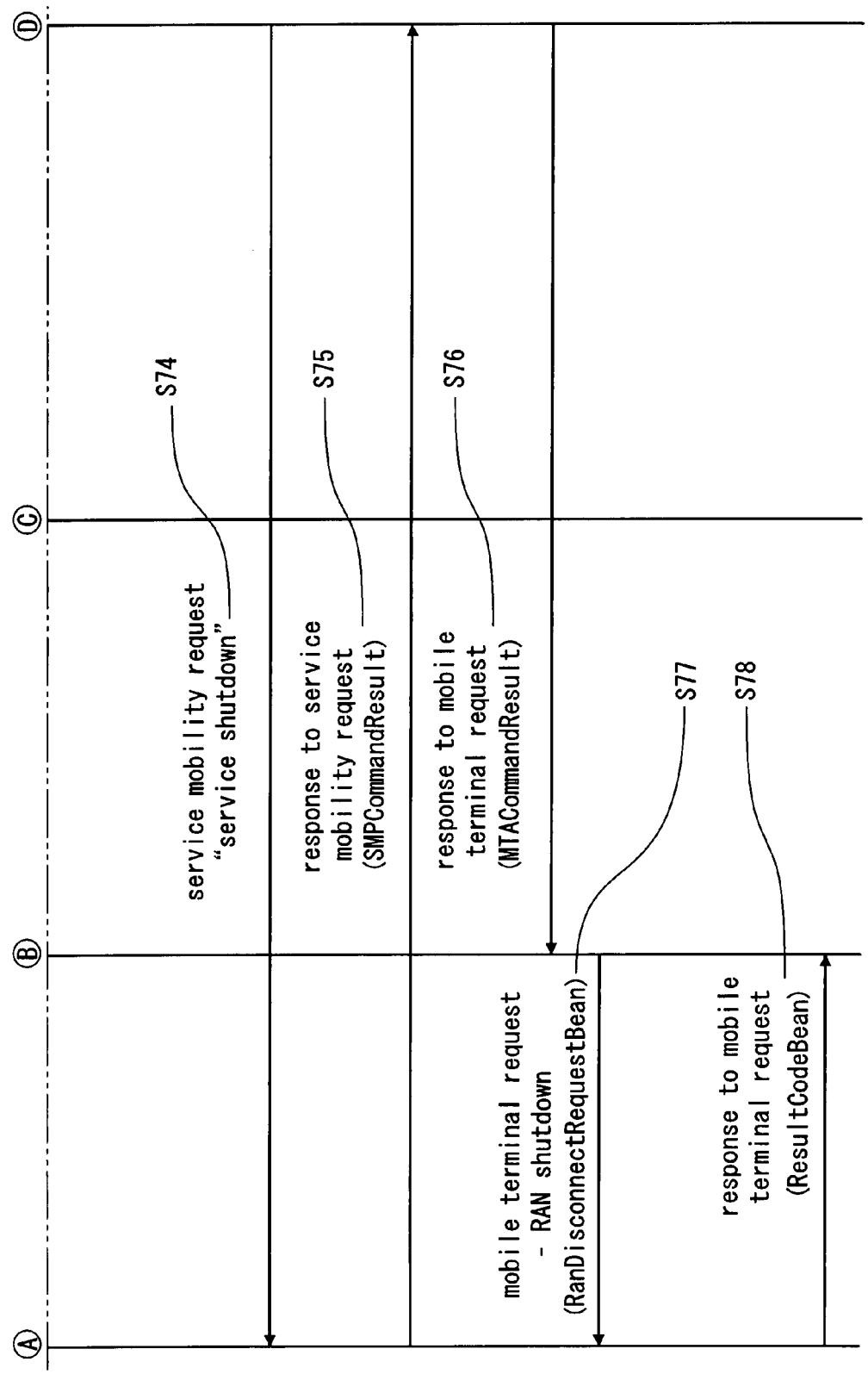

A sequence of communication shutdown after communication ends is as shown in FIG. 13. When user executes shutdown operation on the mobile terminal (20), a session termination request (S71) is sent to the SIP relay processing unit (16).

When the mobile terminal at a transmission destination sends back a success response, a response arrives at the mobile terminal (20) through the SIP relay processing unit (16) (S72). After the arrival, the mobile terminal (20) requests the network server (10) to stop the service (S73) and after that, stop sequence is executed.

Further, service stop is sent as the service mobility request from the network server (10) to the mobile PC (30) (S74) and after a response (S75), a response to the request for service stop is sent to a mobile terminal (S76).

The mobile terminal (20) which receives this instructs to shut down the RAN by the PAN (S77). In the mobile PC, the RAN connection is shut down so that those communication devices turn to sleep state.

Finally, the communication is ended through a response (S78).

Although the receiving procedure is omitted because it falls under a sending destination of the aforementioned sending procedure, the mobile PC, the mobile terminal, the SIP relay processing unit and network server operate cooperatively.

Next, the hand off of the SIP communication will be described. This is technology for taking over communication from a hand off terminal on hold to a hand off destination terminal.

Figure 14B:
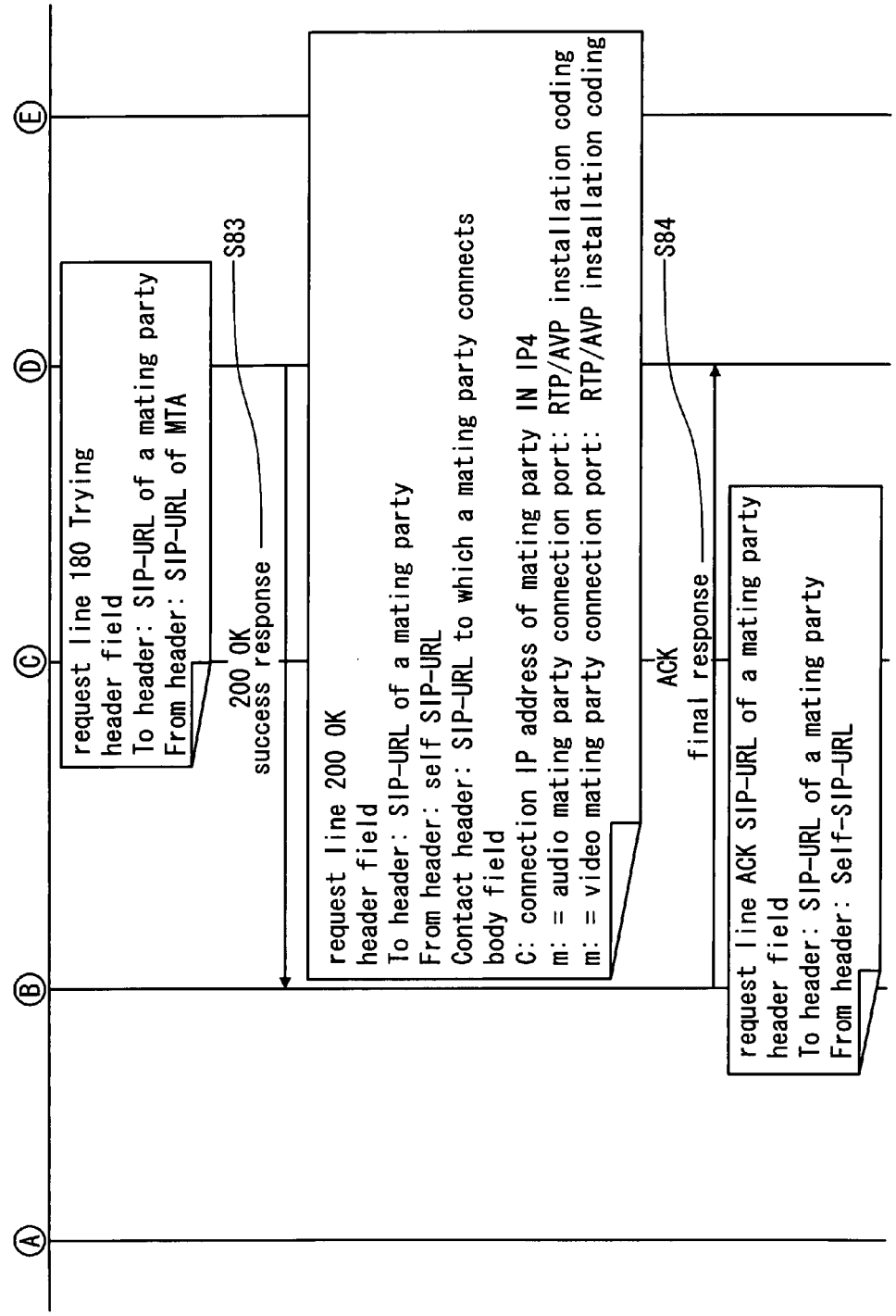
FIG. 14 shows a sequence upon hand off of communication from the mobile PC in SIP communication.

As shown in FIG. 14, first of all, the hand off terminal (30a) is on hold.

When the hand off operation is carried out on the user mobile terminal, the mobile terminal (20) sends a request for establishing a session again is sent to the SIP relay processing unit (16) and a temporary response (S82) and a success response (S83) are received from a hand off destination.

After a final response (S84) is sent after receiving this, the mobile terminal (20) sends a service startup request to the network server (10) to request for startup of the service of hand off destination. After that, service startup processing is carried out from the network server (10) to the hand off destination and when it ends, a response (S86) is sent back to the mobile terminal.

The hand off of the SIP communication is realized by the above sequence.

At the same time, the mobile terminal (20) sends a service stop request (S87) to the network server and correspondingly, a service stop request (S88) is sent to the hand off station mobile PC (30a). A following procedure is the same as ordinary communication shutdown.

In case of such SIP communication, more detailed application can be selected using the location information server system of the present invention.

That is, the fixed terminal or mobile terminal which starts up a service is equipped with application database having an available application at the time of starting the service. This database is a data table as shown in FIG. 15 and FIG. 16 and as shown in FIG. 15, UPI value of the location information server (50) and the like is changed to meta-data and then, as shown in FIG. 16, whether application corresponding to each meta data is available is set up.

With this configuration, a desired setting on callee side, for example, of skipping video communication when user is located in a conference room, can be made. Because that information is notified a caller through the signaling communication when a call arrives as an application impossible to communicate, arrival of a call with an application not desired by the callee can be blocked.

Figure 17A:
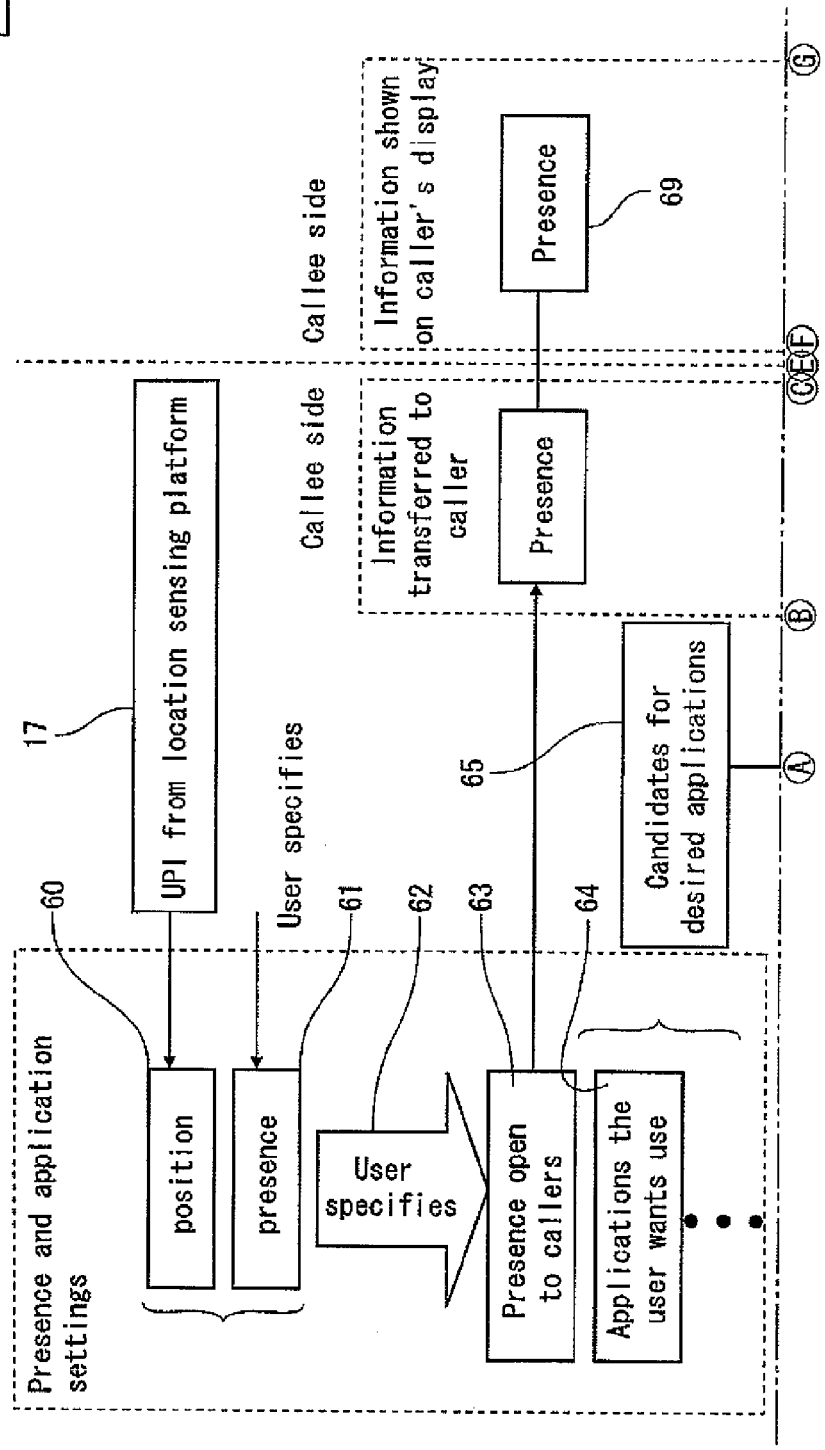
FIG. 17 shows a sequence at the time of call arrival in the location information server.
Figure 17B:
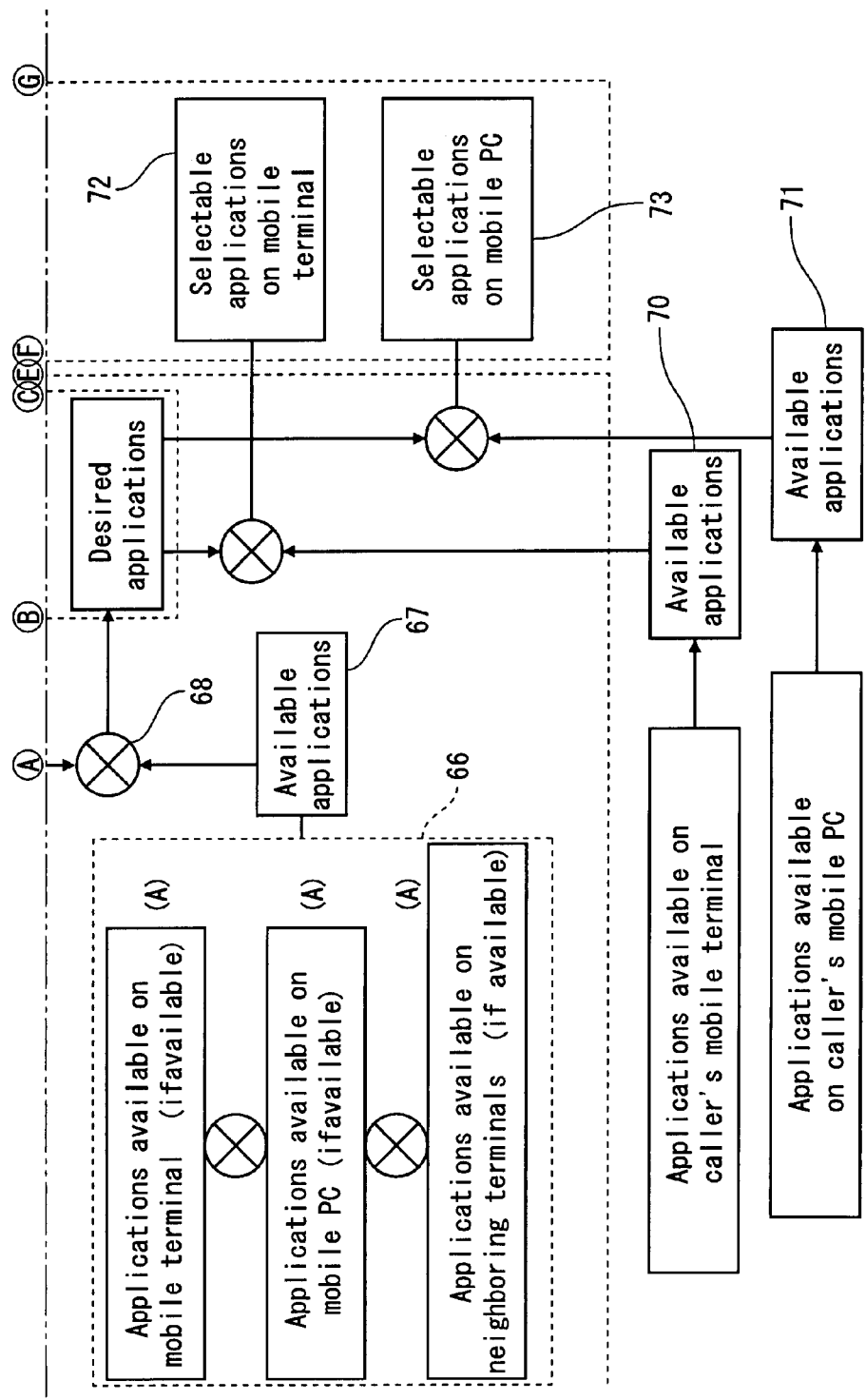

FIG. 17 shows a detailed sequence at the time of call arrival. Presence is publicized to a caller (63) according to setting (62) for disclosure by user from the location information (60) from the location information platform (17) and the setting of user (61).

A candidate of application (65) is extracted from applications (64) desired by user.

On the other hand, a mobile terminal, mobile PC or application which can be executed by any neighboring terminal is extracted (OR) (66) and an available application (67) is selected. A desired application (69) is determined by AND selection (68) between this and the candidate application (65).

Further, an application (70) available at a mobile terminal of a caller or an application (71) available at a mobile PC are selected from the caller side and an application selectable on the caller side (either on the mobile terminal (72) or on the mobile PC (73)) is displayed on a display on the caller side by taking AND with desired application (69).

The caller can select by taking these pieces of information into account.

The invention claimed is:

1. A location information server system for acquiring the status of, and activating, a user terminal in wireless communication network, comprising:
a plurality of sensor means capable of communicating through a network;
a priority database to location information from each sensor means;
location information selecting means for selecting a location information having a high priority from overlapping location information with reference to the database;
a sensor information integration processing means which integrates acquisition information from at least two sensor means of the sensor means, including acquired location information acquired identification information of a user terminal, wherein information from each sensor means is accumulated in the location information server as terminal location information database and the location information server means includes a location information providing means capable of providing the sensor information to a predetermined network server corresponding to the user terminal; and
a service mobility processing function provided for by one of a service startup terminal and a service relay terminal, which actives service of a user terminal on one of a plurality of wireless networks selected by the service mobility processing function,
wherein the location information server system changes over communications between different ones of the plurality of wireless networks by selecting appropriate ones of said wireless networks without interrupting a user's continuing communication or making the user conscious of the changes between wireless networks.

2. The location information server system according to claim 1 which uses at least any of receiving means for floor sensor information which detects RFID tag information, wireless LAN access point identification information, ultrasonic wave sensing information and a position on floor of user, as the sensor means.

3. The location information server system according to claim 1, further including a communicating means capable of receiving location information from user terminal so as to receive measuring information of GPS receiver, direction sensor and acceleration sensor disposed at the user terminal.

4. A wireless communication system capable of establishing connection of basic access network capable of signaling communication concerned with continuous communication switch control and access network for carrying out other data communication than the signaling communication at the same time using at least two or more kinds of communication networks including wireless communication network, the wireless communication system including wireless communication terminal, basic access network terminal, network server and location information server system, wherein
the wireless communication terminal includes: an access communication processing unit capable of communicating with at least two or more kinds of communication networks including the wireless communication network; each network device corresponding to each communication network; a passage and device for communicating with the basic access network terminal; and a basic access network client processing unit having client function in signaling communication concerned with connection/disconnection processing request with at least an access network acquired through the communication pathway, the network server includes: management information database having user information and device information concerned with the basic access network terminal; and a basic access network server processing unit which controls signaling communication concerned with communication control containing registration/updating processing of at least the basic access network terminal with the basic access network terminal when switching communication with an access network continuously, the basic access network terminal includes: basic access network signaling processing unit which carries out signaling communication with the basic access network server processing unit of the network server and with the basic access network client processing unit of the wireless communication terminal; and a device control unit which at least controls the communication device, and the position information server system includes at least a plurality of sensor devices capable of communicating through communication network or basic access network and location information server, the location information server having a location information acquisition processing unit for acquiring the basic access network terminal position and wireless communication terminal position with the sensor device, a terminal position information database storage unit which accumulates and stores the acquired information, a location information communication processing unit which communicates the content of the terminal position information database with the basic access network signaling processing unit of the network server and a service mobility processing function provided for by one of a service startup terminal and a service relay terminal, which actives service of a user terminal on one of a plurality of wireless networks selected by the service mobility processing function, wherein the wireless communication system changes over communications between different ones of a plurality of wireless networks by selecting appropriate ones of said wireless networks without interrupting a user's continuing communication or making the user conscious of the changes between wireless networks.

5. The wireless communication system according to claim 4, wherein the location information server comprises: a priority database relative to location information from each sensor means; location information selecting means for selecting a location information having a high priority from overlapping location information with reference to the database; and a sensor information integration processing means which integrates acquisition information from at least two sensor means, including acquired location information and acquired identification information of the basic access network so as to acquire the basic access network terminal position or wireless communication terminal position, wherein information from each sensor means is accumulated in the location information server as terminal location information database.

6. The wireless communication system according to claim 4, wherein the basic access network terminal includes an application database having an application available at the time of startup of a service at the wireless communication terminal or the basic access network terminal and information of available applications corresponding to presence information concerning with the position and status of user is registered in the application database so that the information is capable of being transmitted to a communication mate through the basic access network.

7. The wireless communication system according to claim 4, wherein the basic access network terminal and the wireless communication terminal are constructed integrally while the communication pathway is connected directly inside.

\* \* \* \* \*